(12) United States Patent
Wang et al.

(10) Patent No.: US 12,466,538 B1
(45) Date of Patent: Nov. 11, 2025

(54) AIRFOIL COUPLING SYSTEMS AND METHODS

(71) Applicant: The Boeing Company, Arlington, VA (US)

(72) Inventors: Michael Chih-Huan Wang, Seattle, WA (US); Elizabeth Rose Benson, Lynnwood, WA (US); Patrick Alan Woodard, Bothell, WA (US); Mark Melvin Bleazard, Pasco, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/768,096

(22) Filed: Jul. 10, 2024

(51) Int. Cl.
*B64C 3/26* (2006.01)
*B64C 3/18* (2006.01)

(52) U.S. Cl.
CPC ............... *B64C 3/26* (2013.01); *B64C 3/187* (2013.01)

(58) Field of Classification Search
CPC ............. B64C 1/12; B64C 3/187; B64C 3/26
See application file for complete search history.

(56) References Cited

U.S. PATENT DOCUMENTS

| | | | | |
|---|---|---|---|---|
| 2,496,024 A | * | 1/1950 | Schwendler | B64C 3/00 244/124 |
| 4,356,616 A | * | 11/1982 | Scott | B64C 3/187 52/84 |
| 4,481,703 A | * | 11/1984 | Scott | B64C 3/187 244/123.1 |
| 5,518,208 A | * | 5/1996 | Roseburg | B64C 1/064 244/119 |
| 7,740,202 B2 | * | 6/2010 | Namaizawa | B64C 3/18 244/131 |
| 7,967,248 B2 | * | 6/2011 | Halme | B64C 3/187 244/123.1 |
| 8,056,859 B2 | * | 11/2011 | Kunichi | B64C 3/187 244/123.1 |
| 8,186,622 B2 | * | 5/2012 | Munday | B64C 3/26 244/129.1 |
| 8,578,609 B2 | * | 11/2013 | Latorre Plaza | B64C 3/34 264/258 |

(Continued)

FOREIGN PATENT DOCUMENTS

| | | | | |
|---|---|---|---|---|
| FR | 3101611 A1 | * | 4/2021 | ............. E04C 2/326 |
| WO | WO-2010049565 A1 | * | 5/2010 | ............. B64C 3/187 |
| WO | WO-2016107950 A1 | * | 7/2016 | ............. B64C 3/187 |

*Primary Examiner* — Joseph W Sanderson
(74) *Attorney, Agent, or Firm* — Mary D. Lawlor; The Small Patent Law Group, LLC

(57) ABSTRACT

An airfoil coupling system includes plural airfoil coupling structures, each of which includes a body having a horizontal flange with a first coupling interface that is coupled with panels of an airfoil of an aircraft. The first coupling interface extends between first and second ends in a first direction, and between third and fourth ends in a second direction. The body also includes a vertical flange having a mating end that is coupled with the horizontal flange. The vertical flange includes a second coupling interface that is coupled with a rib of the airfoil. The second coupling interface extends between fifth and sixth ends in the second direction, and between mating and free ends in a third direction. Each of the airfoil coupling structures are disposed at different locations along a length of the rib between a leading edge and a trailing edge of the rib.

12 Claims, 14 Drawing Sheets

(56) References Cited

U.S. PATENT DOCUMENTS

| | | | | |
|---|---|---|---|---|
| 8,715,808 B2* | 5/2014 | Roming | | B64C 1/064 |
| | | | | 428/113 |
| 9,272,769 B2* | 3/2016 | Lin | | B64C 3/26 |
| 9,701,391 B2* | 7/2017 | Axford | | B64C 3/26 |
| 10,023,293 B2* | 7/2018 | Gaitonde | | B64C 3/182 |
| 10,196,126 B2* | 2/2019 | Barakatain | | B64U 20/70 |
| 10,450,053 B2* | 10/2019 | Doyle | | G06F 30/17 |
| 10,457,378 B2* | 10/2019 | Kooiman | | B64C 3/18 |
| 11,046,414 B2* | 6/2021 | Batalla | | B64C 1/26 |
| 11,059,561 B2* | 7/2021 | Kooiman | | B64C 3/187 |
| 11,198,497 B2* | 12/2021 | Durbin | | B64C 1/069 |
| 11,319,051 B2* | 5/2022 | Mohammed | | B64C 3/187 |
| 11,724,791 B2* | 8/2023 | McLean | | B64C 3/26 |
| | | | | 244/123.1 |
| 12,077,289 B2* | 9/2024 | Spreadbury | | B64C 1/065 |
| 12,275,524 B2* | 4/2025 | McNaught | | B64C 3/185 |
| 2007/0023573 A1* | 2/2007 | Neale | | B64C 3/187 |
| | | | | 244/124 |
| 2008/0128552 A1* | 6/2008 | Namaizawa | | B64C 3/18 |
| | | | | 244/123.1 |
| 2008/0223987 A1* | 9/2008 | Halme | | B64C 3/187 |
| | | | | 403/287 |
| 2009/0272848 A1* | 11/2009 | Munday | | B64C 3/18 |
| | | | | 244/131 |
| 2009/0314892 A1* | 12/2009 | Kunichi | | B64C 3/187 |
| | | | | 244/123.1 |
| 2010/0272954 A1* | 10/2010 | Roming | | B64C 1/069 |
| | | | | 29/428 |
| 2011/0303357 A1* | 12/2011 | Plaza | | B64C 1/26 |
| | | | | 156/281 |
| 2012/0104168 A1* | 5/2012 | Latorre Plaza | | B64C 1/06 |
| | | | | 156/92 |
| 2012/0132748 A1* | 5/2012 | Axford | | B64C 3/26 |
| | | | | 244/119 |
| 2012/0234978 A1* | 9/2012 | Hernando Navas | | B64C 3/20 |
| | | | | 244/132 |
| 2013/0164489 A1* | 6/2013 | Gaitonde | | B64C 3/182 |
| | | | | 29/897 |
| 2014/0131518 A1* | 5/2014 | Lin | | B64C 3/26 |
| | | | | 244/131 |
| 2016/0297511 A1* | 10/2016 | Barakatain | | B64U 20/70 |
| 2017/0259905 A1* | 9/2017 | Kooiman | | B29D 99/0021 |
| 2017/0327201 A1* | 11/2017 | Doyle | | G01B 11/005 |
| 2019/0161156 A1* | 5/2019 | Batalla | | B64C 1/26 |
| 2019/0217942 A1* | 7/2019 | Kooiman | | B64C 3/187 |
| 2020/0398967 A1* | 12/2020 | Durbin | | B23P 15/00 |
| 2021/0101669 A1* | 4/2021 | McLean | | B64F 5/10 |
| 2021/0206471 A1* | 7/2021 | Mohammed | | B64C 3/187 |
| 2022/0097820 A1* | 3/2022 | Spreadbury | | B64C 1/065 |
| 2022/0135203 A1* | 5/2022 | Mcnaught | | B64C 3/187 |
| | | | | 244/123.8 |

* cited by examiner

AIRFOIL COUPLING SYSTEMS AND METHODS

FIELD OF THE DISCLOSURE

Examples of the present disclosure generally relate to airfoil coupling systems, such as for coupling a rib of an airfoil of an aircraft to panels of the airfoil.

BACKGROUND OF THE DISCLOSURE

An aircraft airfoil, such as a wing or an empennage stabilizer, includes rib structures that are used to stiffen the airfoil. The rib structures are positioned within a wing box of the airfoil and extend between leading and trailing edges of upper and lower skin panels of the airfoil. In certain airfoil assemblies, large chords have been used to make the joint between the rib structures and the upper and lower skin panels. For example, a first chord may extend generally between the leading and trailing edges of the airfoil and may be used to couple an upper portion of the rib structure with an upper skin panel, and a second chord may extend generally between the leading and trailing edges of the airfoil and may be used to couple a lower portion of the rib structure with a lower skin panel.

As can be appreciated, assembling an airfoil that includes large chords to join the skin panels with the rib structures may be difficult and expensive to procure the raw materials, may require a substantial amount of time to manufacture and assemble within the aircraft airfoil, and may be ergonomically challenging for operators installing the chords within the airfoil.

SUMMARY OF THE DISCLOSURE

A need exists for a system that can couple a rib of an airfoil with one or more skin panels of the airfoil using plural separate, discretely segmented T-chord coupling structures.

With those needs in mind, certain examples of the present disclosure provide an airfoil coupling system that includes plural airfoil coupling structures. Each of the airfoil coupling structures includes a body having a horizontal flange with a first coupling interface that is configured to be operably coupled with one or more panels of an airfoil of an aircraft. The first coupling interface extends between a first end and a second end in a first direction, and between a third end and a fourth end in a second direction. The body also includes a vertical flange having a mating end that is coupled with the horizontal flange. The vertical flange includes a second coupling interface that is configured to be operably coupled with a rib of the airfoil of the aircraft. The second coupling interface extends between a fifth end and a sixth end in the second direction, and between the mating end and a free end in a third direction. Each of the airfoil coupling structures are configured to be disposed at locations along a length of the rib between a leading edge and a trailing edge of the rib.

In one example, the fifth end of the vertical flange may be offset from the third end of the horizontal flange, and the sixth end of the vertical flange may be offset from the fourth end of the horizontal flange in the second direction. Optionally, the vertical flange may extends in a radial direction away from the horizontal flange.

In another example, the vertical flange may include plural fastener features that may be arranged in a pattern. The pattern may include at least two rows extending between the fifth and sixth ends of the vertical flange. Each of the two rows may include one or more fastener features. Optionally, the one or more fastener features in a first row may be linearly offset from the one or more fastener features in a second row in the second direction.

In another example, a first portion of the horizontal flange may be operably coupled with a first panel of the airfoil, and a second portion of the horizontal flange may be operably coupled with a second panel of the airfoil. Optionally, the first coupling interface of the horizontal flange may be operably coupled with a lower skin panel of the airfoil or an upper skin panel of the airfoil of the aircraft.

In another example, the first length between the third end and the fourth end of the horizontal flange may be a fraction of the distance between the leading edge and the trailing edge of the rib, and the second length between the fifth end and the sixth end of the vertical flange may be a fraction of the distance between the leading edge and the trailing edge of the rib.

Certain examples of the present disclosure provide an airfoil coupling system that may secure a rib of an airfoil of an aircraft to panels of the airfoil. The airfoil coupling system may include plural upper coupling structure and plural lower coupling structures. Each of the upper coupling structures may include a body including an upper horizontal flange and an upper vertical flange operably coupled with the upper horizontal flange. The upper horizontal flange of each of the upper coupling structures may include an upper coupling interface that may be operably coupled with at least one of the panels of the aircraft. The upper vertical flange of each of the upper coupling structures may be operably coupled with the rib of the airfoil. Each of the lower coupling structures may include a body including a lower horizontal flange and a lower vertical flange operably coupled with the lower horizontal flange. The lower horizontal flange of each of the lower coupling structures may include a lower coupling interface that may be operably coupled with at least one of the panels of the airfoil. The lower vertical flange of each of the lower coupling structures may be operably coupled with the rib of the airfoil. The plural upper coupling structures may be operably coupled with an upper portion of the rib at locations along a first length of the upper portion of the rib between a leading edge and a trailing edge of the rib. The plural lower coupling structures may be operably coupled with a lower portion of the rib at locations along a second length of the lower portion of the rib between the leading edge and the trailing edge of the rib.

Certain examples of the present disclosure provide an airfoil assembly that includes an upper airfoil skin panel that extends between an upper leading edge and an upper trailing edge in a first direction, a lower airfoil skin panel that extends between a lower leading edge and a lower trailing edge in the first direction, and a rib structure extending between a top portion and a bottom portion. The top portion may be disposed proximate an interior surface of the upper airfoil skin panel and the bottom portion may be disposed proximate an interior surface of the lower airfoil skin panel. The rib structure may extend between a front end disposed proximate the upper leading edge and the lower leading edge, and a rear end disposed proximate the upper trailing edge and the lower trailing edge in the first direction.

The airfoil assembly includes plural discrete upper coupling structures and plural discrete lower coupling structures. Each of the discrete upper coupling structures include a body including an upper horizontal flange and an upper vertical flange operably coupled with the upper horizontal flange. The upper horizontal flange of each of the discrete upper coupling structures includes an upper coupling interface that may be operably coupled with the interior surface of the upper airfoil skin panel. The upper vertical flange of each of the discrete upper coupling structures may be operably coupled with the trop portion of the rib structure. Each of the discrete lower coupling structures may include a body including a lower horizontal flange and a lower vertical flange operably coupled with the lower horizontal flange. The lower horizontal flange of each of the discrete lower coupling structures may include a lower coupling interface that may be operably coupled with the interior surface of the lower airfoil skin panel. The lower vertical flange of each of the discrete lower coupling structures may be operably coupled with the bottom portion of the rib structure. Each of the discrete upper coupling structures may be operably coupled with the top portion of the rib structure at locations along a firth length of the top portion of the rib structure between the front end and the rear end of the rib structure. Each of the discrete lower coupling structures may be operably coupled with the bottom portion of the rib structure at locations along a second length of the bottom portion of the rib structure between the front end and the rear end of the rib structure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, examples of the present disclosure provide airfoil coupling systems and methods for assembling airfoil ribs with airfoil panels, such as skin panels. In one example, the airfoil coupling systems may include plural discretely segmented upper and/or lower T-chord coupling structures. Each of the individual T-chord coupling structures may include a vertical flange that may be operably coupled with a portion of the rib and a horizontal flange that may be operably coupled with a portion of one or more skin panels of the airfoil. For example, the upper discretely segmented T-chord coupling structures may be coupled with an upper portion of the rib and with one or more upper skin panels of the airfoil. The lower discretely segmented T-chord coupling structures may be coupled with a lower portion of the rib and with one or more lower skin panels of the airfoil. The rib may extend between a leading edge and a trailing edge between a forward and aft direction of the aircraft. Each of the individual, discretely segmented T-chord upper and lower coupling structures may be positioned at locations along the length of the rib between the leading edge and the trailing edge of the rib.

The airfoil coupling assemblies may include extension structures that may be coupled with the rib and extend between the upper and lower skin panels of the airfoil. For example, the extension structures may represent rib stiffeners that may provide a load path between the upper and lower skin panels of the airfoil. Additionally, the extension structures may include a first end that is coupled with one or more upper T-chord coupling structures and a second end that is coupled with one or more lower T-chord coupling structures. The placement of the extension structures relative to the one or more upper T-chord coupling structures and the one or more lower T-chord coupling structures may control an amount or level of stress of one or more fasteners of the upper and/or lower T-chord coupling structures, may control an amount of rocking and/or pivoting motion of one or more fasteners of the upper and lower T-chord coupling structures, may control a stiffness and/or structural load of the rib relative to the upper and lower skin panels, or the like.

Figure 1:
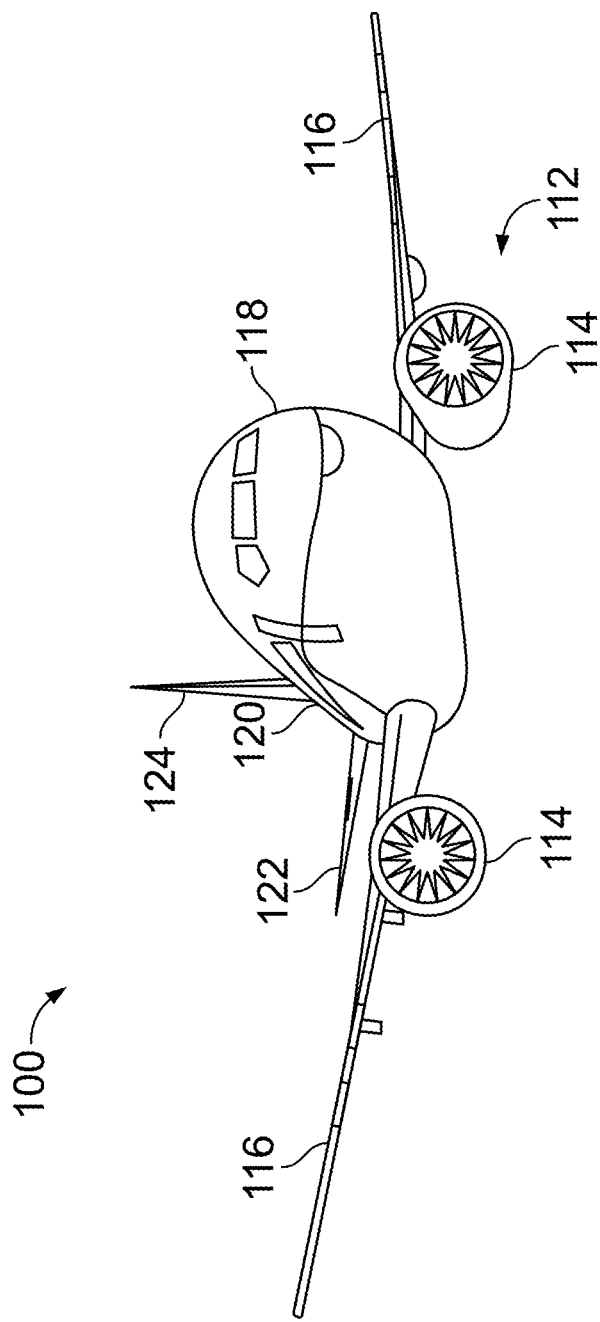
FIG. 1 illustrates a perspective front view of an aircraft, according to an example of the present disclosure.

FIG. 1 illustrates a perspective front view of the aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124. The fuselage 118 of the aircraft 100 defines an internal cabin, which includes a flight deck or cockpit, one or more work sections (for example, galleys, personnel carry-on baggage areas, and the like), one or more passenger sections (for example, first class, business class, and coach sections), one or more lavatories, and/or the like. FIG. 1 shows an example of an aircraft 100. It is to be understood that the aircraft 100 can be sized, shaped, and configured differently than shown in FIG. 1.

Figure 2:
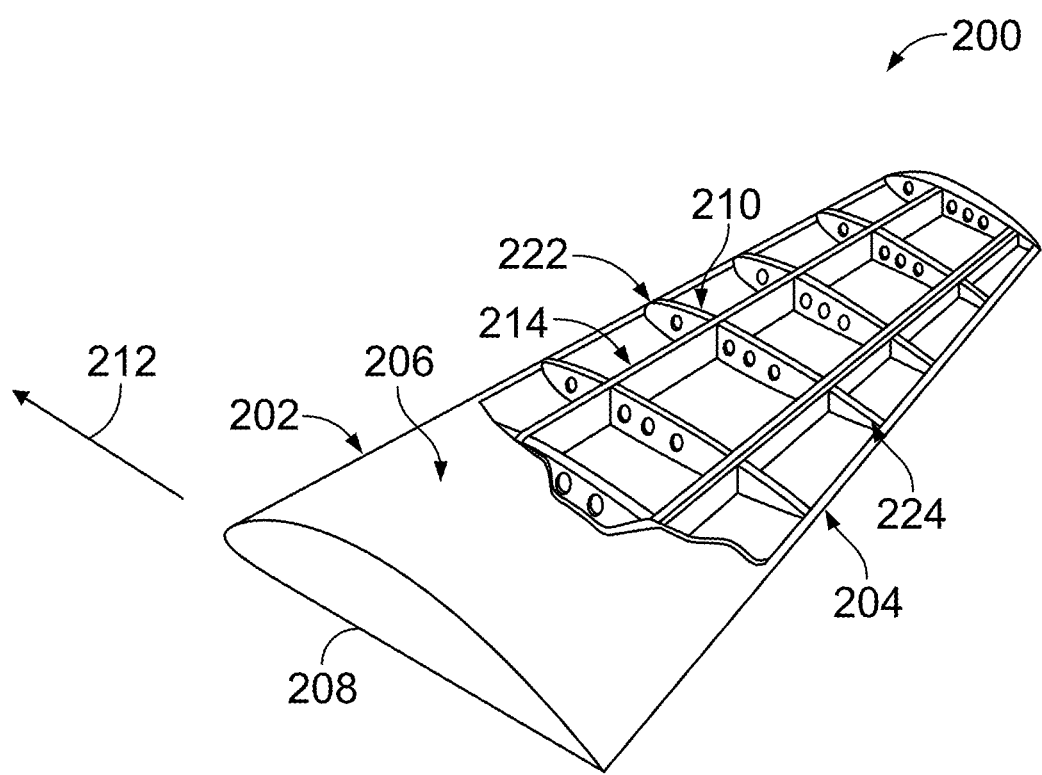
FIG. 2 illustrates a schematic of a partial cross-sectional view of an airfoil of an aircraft, according to an example of the present disclosure.

FIG. 2 illustrates a schematic of a partial cross-sectional view of an airfoil 200 of an aircraft, according to an example of the present disclosure. In one example, the airfoil 200 illustrated in FIG. 2 may represent the wings 116, the horizontal stabilizers 122, and/or the vertical stabilizer 124 of the aircraft 100 shown in FIG. 1.

The airfoil 200 includes plural ribs 210 disposed within a cavity of the airfoil 200 defined by an upper skin panel 206 and a lower skin panel 208. The upper and lower skin panels 206, 208 extend between a leading edge 202 of the airfoil 200 and a trailing edge 204 of the airfoil 200 based on a forward direction of travel 212 of the airfoil 200. Each of the ribs 210 includes a leading edge 222 that is disposed proximate the leading edge 202 of the airfoil 200 and a trailing edge 224 that is disposed proximate the trailing edge 204 of the airfoil 200. The airfoil 200 also includes plural spars 214 that extend between and are operably coupled with the ribs 210.

Figure 3:
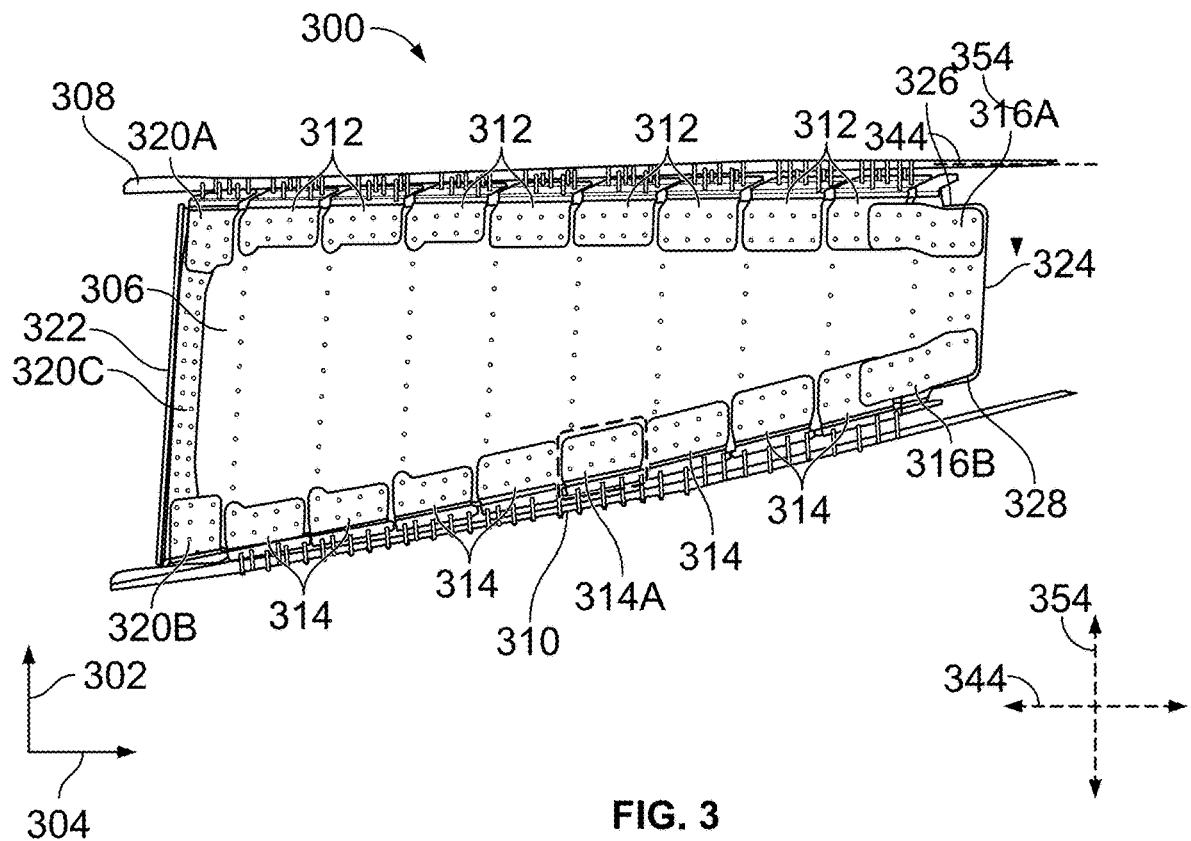
FIG. 3 illustrates a side view of an airfoil coupling system, according to an example of the present disclosure.
Figure 4:
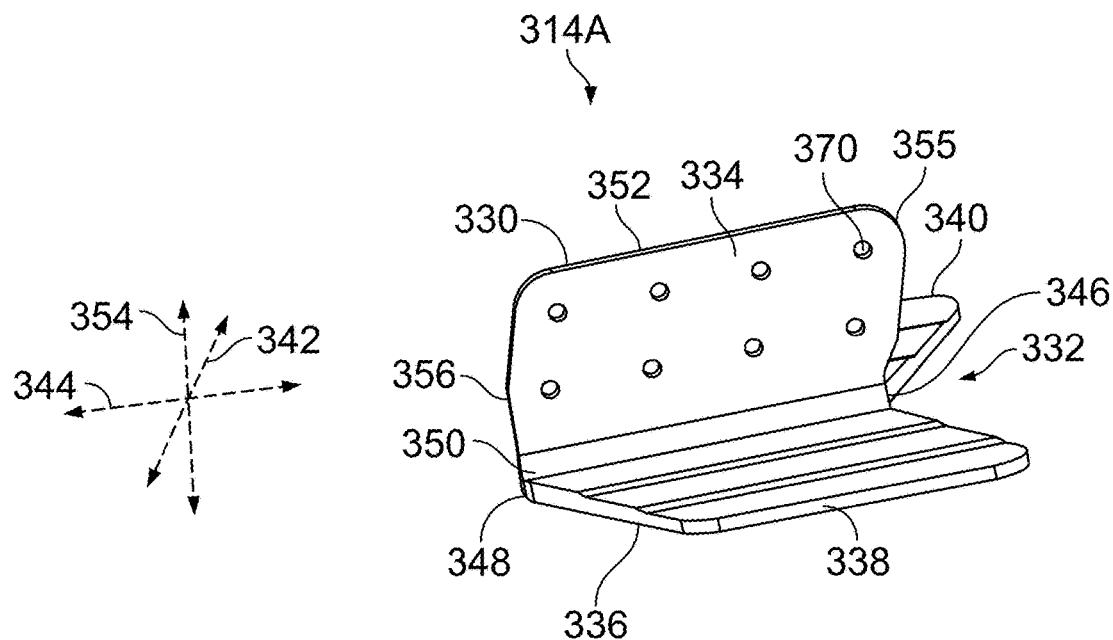
FIG. 4 illustrates a side view of a lower coupling structure of the airfoil coupling system shown in FIG. 3, according to an example of the present disclosure.

FIG. 3 illustrates a side view of an airfoil coupling system 300 and FIG. 4 illustrates a side view of a lower coupling structure 314 of the airfoil coupling system 300, according to an example of the present disclosure. In one example, the airfoil coupling system 300 may be used to couple or join a rib 306 of an airfoil with a skin panel (not shown in FIG. 3) of the airfoil. In the illustrated example shown in FIG. 3, the rib extends between a leading edge 322 and a trailing edge 324 based on an aft direction 304 towards an aft end of an aircraft (not shown) and an upward direction 302.

In one or more examples, the rib 306 may be positioned at and/or represent one or more joint lines of an airfoil, such as a butt-line zero (BLO) joint of the horizontal stabilizer 122 shown in FIG. 1. In another example, the rib 306 may be positioned at and/or represent an alternative joint line of the horizontal stabilizer 122, of one of the wings 116, of the vertical stabilizer 124, or the like.

The airfoil coupling system 300 includes plural discrete, separate, and individual upper coupling structures 312 and plural discrete, separate, and individual lower coupling structures 314. The upper coupling structures 312 are operably coupled with and extend between an upper splice 308 and an upper portion 326 of the rib 306. The lower coupling structures 314 are operably coupled with and extend between a lower splice 310 and a lower portion 328 of the rib 306. In one example, the airfoil coupling system 300 may include one or more additional forward end coupling structures 320A-C and/or one or more additional aft end coupling structures 316A-B.

In the illustrated example, the airfoil coupling system 300 includes eight upper coupling structures 312 and eight lower coupling structures 314. In alternative examples, the airfoil coupling system 300 may include less than eight or more than eight upper coupling structures 312, and/or less than eight or more than eight lower coupling structures 314. In another example, the airfoil coupling system 300 may include a number of upper coupling structures 312, and a different number of lower coupling structures 314. In one example, one or more of the upper coupling structures 312 may have a size, shape, and/or arrangement that may be different than a size, shape, and/or arrangement of one or more other upper coupling structures 312. Optionally, one or more of the lower coupling structures 314 may have a size, shape, and/or arrangement that may be different than a size, shape, and/or arrangement of one or more other lower coupling structures 314.

In the illustrated example of one of the lower coupling structures 314 shown in FIG. 4, the lower coupling structure 314A includes a body 330 having a lower horizontal flange 332 and a lower vertical flange 334. The lower horizontal flange 332 includes a first coupling interface 336 that is positioned opposite from the lower vertical flange 334. The first coupling interface 336 extends between a first end 338 and a second end 340 in a first direction 342, and between a third end 346 and a fourth end 348 in a second direction 344. The first coupling interface 336 is configured to be operably coupled and/or face towards the lower splice 310 shown in FIG. 3. In one example, the horizontal flange 332 may be coupled with the lower splice 310 via one or more fastener features, fastener passages, or the like (not shown in FIG. 4), or some alternative coupling system.

The lower vertical flange 334 includes a mating end 350 that is operably coupled with the lower horizontal flange 332 at a position between the first and second ends 338, 340 of the horizontal flange 332. The lower vertical flange 334 includes a second coupling interface (not shown in FIG. 4) that is configured to be operably coupled with a portion of the rib 306 via one or more fastener features 370 of the vertical flange 334. The lower vertical flange 334 extends between a fifth end 355 and a sixth end 356 in the second direction 344, and between the mating end 350 and a free end 352 in a third direction 354.

In one or more examples, the horizontal flange 332 extends a first length between the third end 346 and the fourth end 348 in the second direction 344. The first length of the horizontal flange 332 is less than a distance between the leading edge 322 and the trailing edge 324 of the rib 306 in the second direction 344. For example, the lower coupling structure 314 is shaped and sized so that the first length between the third and fourth ends 346, 348 of the horizontal flange 332 is a fraction or a percentage of the distance between the leading and trailing edges 322, 324 of the rib 306.

In one example, one or more of the upper coupling structures 312 may have a body with an arrangement that is similar to the arrangement of the body 330 of the lower coupling structure 314A. For example, each of the upper coupling structure 312 include a body having a horizontal flange that includes a first coupling interface that is configured to be coupled with the upper splice 308 and a vertical flange operably coupled with the horizontal flange that includes a second coupling interface that is configured to be coupled with an upper portion of the rib 306. The horizontal flange of the upper coupling structures 312 extends a length in the second direction 344 that is less than a length of the rib 306 between the leading and trailing edges 322, 324 of the rib 306.

In one or more examples, the upper and lower coupling structures 312, 314 may be referred to as T-chords, discrete T-chords, or the like, based on the cross-sectional T-shape of the coupling structures 312, 314 defined by the horizontal and vertical flanges. In another example, the vertical flange may be coupled with the horizontal flange such as to create a cross-sectional L-shape of the coupling structures.

Figure 5:
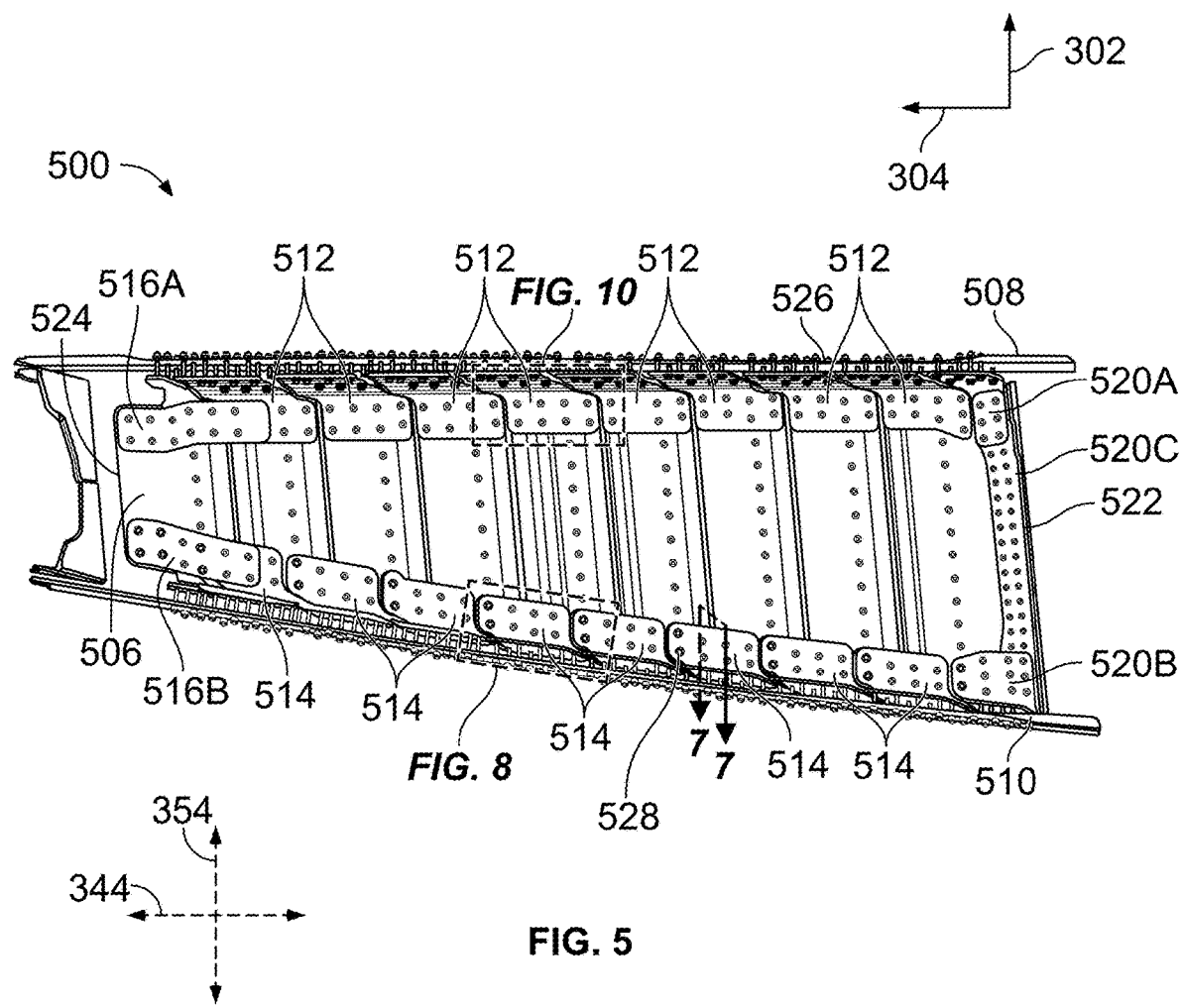
FIG. 5 illustrates a first side view of an airfoil coupling system, according to an example of the present disclosure.
Figure 6:
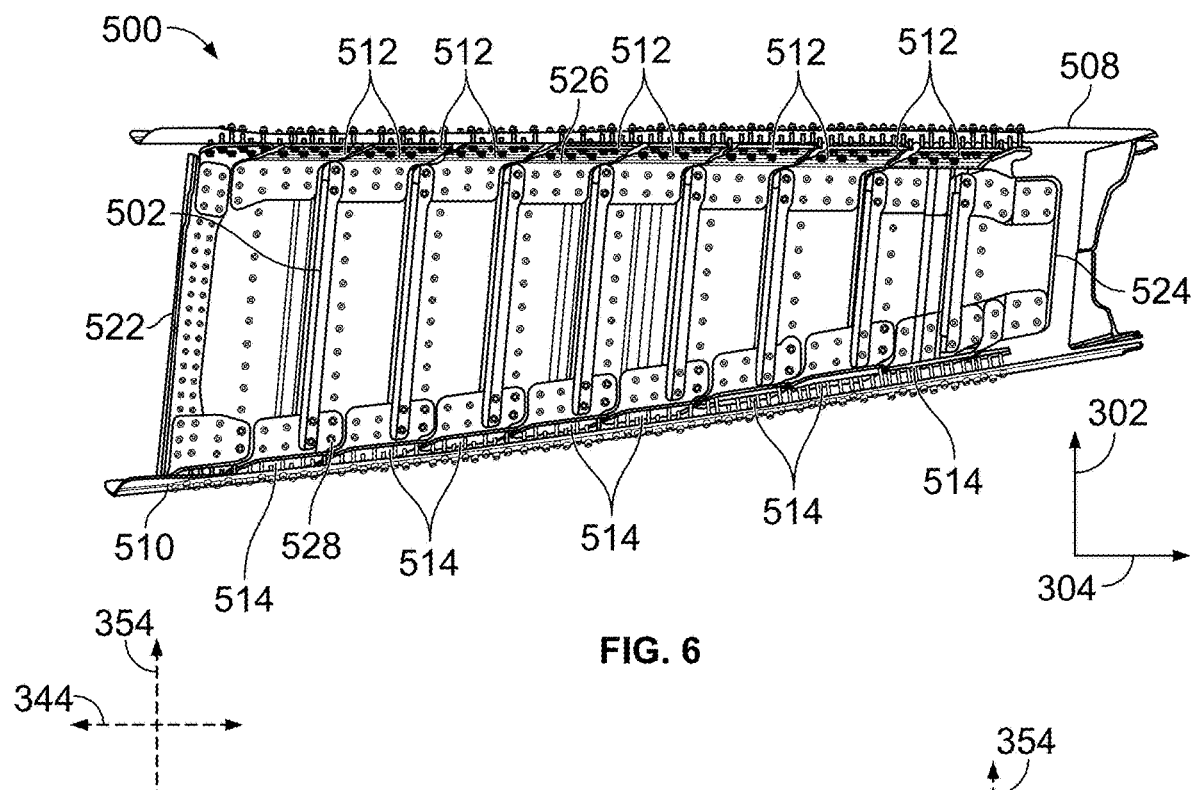
FIG. 6 illustrates a second side view of the airfoil coupling system shown in FIG. 5, according to an example of the present disclosure.

FIG. 5 illustrates a first side view of an airfoil coupling system 500 and FIG. 6 illustrates a second side view of the airfoil coupling system 500, according to an example of the present disclosure. The airfoil coupling system 500 may be used to couple or join a rib 506 of an airfoil with a skin panel (not shown in FIGS. 5 and 6) of the airfoil. In the illustrated example shown in FIGS. 5 and 6, the rib 506 extends between a leading edge 522 and a trailing edge 524 based on the aft direction 304 and the upward direction 302.

The airfoil coupling system 500 includes plural discrete, separate, and individual upper coupling structures 512 and plural discrete, separate, and individual lower coupling structures 514. The upper coupling structures 512 are operably coupled with and extend between an upper splice 508 and an upper portion 526 of the rib 506. The lower coupling structures 514 are operably coupled with and extend between a lower splice 510 and a lower portion 528 of the rib 506. In one example, the airfoil coupling system 500 may include one or more additional forward end coupling structures 520A-C and/or one or more additional aft end coupling structures 516A-B.

Similar to the airfoil coupling system 300 shown in FIG. 3, the airfoil coupling system 500 shown in FIGS. 5 and 6 includes eight upper coupling structures 512 and eight lower coupling structures 514. In alternative examples, the airfoil coupling system 500 may include less than eight or more than eight upper coupling structures 512, and/or less than eight or more than eight lower coupling structures 514. In another example, the airfoil coupling system 500 may include a number of upper coupling structures 512, and a different number of lower coupling structures 514. In one example, one or more of the upper coupling structures 512 may have a size, shape, and/or arrangement that may be different than a size, shape, and/or arrangement of one or more other upper coupling structures 512. Optionally, one or more of the lower coupling structures 514 may have a size, shape, and/or arrangement that may be different than a size, shape, and/or arrangement of one or more other lower coupling structures 514.

Figure 7:
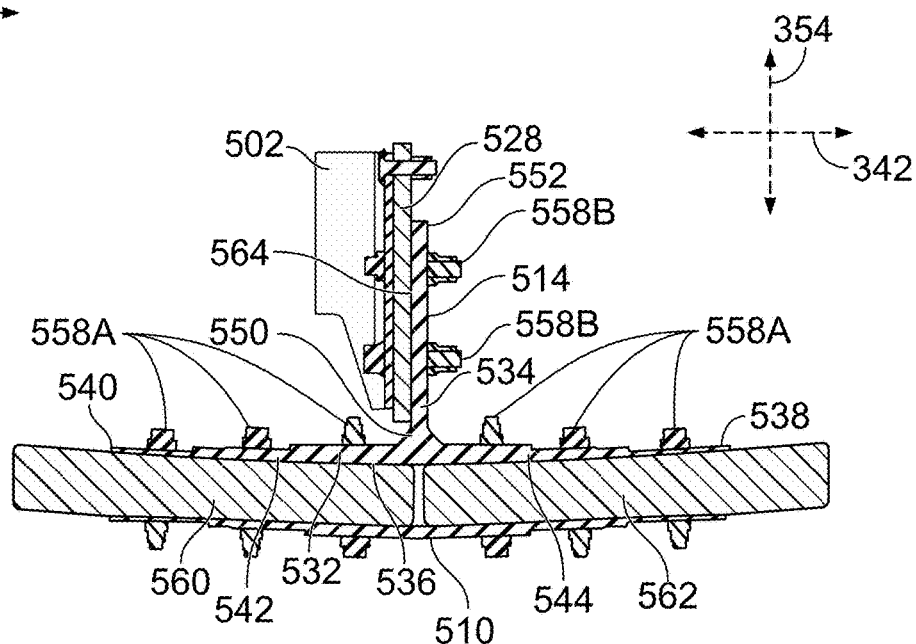
FIG. 7 illustrates a cross-sectional front view of a portion of an airfoil coupling system, according to an example of the present disclosure.

FIG. 7 illustrates a cross-sectional front view of a portion of the airfoil coupling system 500, according to an example of the present disclosure. The partial cross-sectional view includes one of the lower coupling structures 514 The lower coupling structure 514 includes a body having a horizontal flange 532 that extends between a first end 538 and a second end 540 in the first direction 342. The horizontal flange 532 includes a first coupling interface 536 that is operably coupled with a first lower skin panel 560 and a second lower skin panel 562 of an airfoil via plural fasteners 558A extending between the horizontal flange 532 and the lower splice 510 through the first and second lower skin panels 560, 562. For example, the first and second skin lower panels 560, 562 are positioned between the first coupling interface 536 of the horizontal flange 532 and the lower splice 510 with the plural fasteners 558A maintaining the positional arrangement of the lower skin panels 560, 562, the horizontal flange 532, and the lower splice 510. In alternative examples, the airfoil may be devoid the lower splice 510. Optionally, the horizontal flange 532 may be operably coupled with a single skin panel of an airfoil.

The lower coupling structure 514 includes a vertical flange 534 that includes a mating end 550 that is operably coupled with the horizontal flange 532. The vertical flange 534 extends between the mating end 550 and a free end 552 in the third direction 354. The vertical flange 534 includes a second coupling interface 564 that is operably coupled with the lower portion 528 of the rib 506 via one or more fasteners 558B. In the illustrated example, the fasteners 558B extend through passages of the vertical flange 534 and the lower portion 528 of the rib 506 and are coupled with a portion of an extension structure 502. In one example, the extension structure may extend between the lower portion 528 and the upper portion 526 of the rib 506. For example, the extension structure 502 may be referred to as a stiffening structure, a stiffening component, or the like, that may change and/or control a stiffness of the rib 506.

Figure 8:
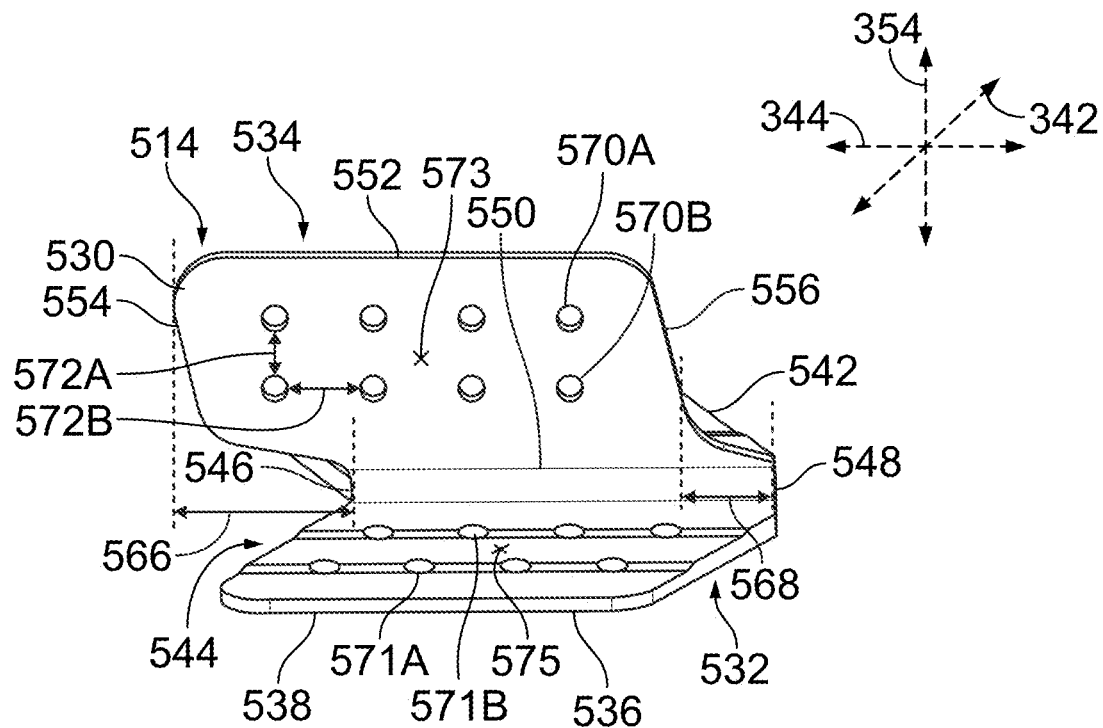
FIG. 8 illustrates a side view of a lower coupling structure of the airfoil coupling system shown in FIGS. 5 and 6, according to an example of the present disclosure.
Figure 9:
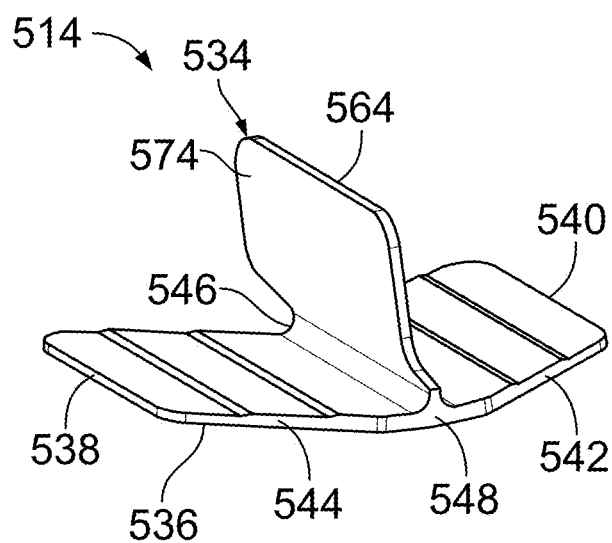
FIG. 9 illustrates a perspective view of the lower coupling structure shown in FIG. 8, according to an example of the present disclosure.

FIG. 8 illustrates a side view of one of the lower coupling structures 514 of the airfoil coupling system 500 and FIG. 9 illustrates a perspective view of the lower coupling structure 514, according to an example of the present disclosure. Like the lower coupling structure 314 illustrated in FIG. 4, the lower coupling structure 514 includes a body 530 that includes the horizontal flange 532 and the vertical flange 534 operably coupled with the horizontal flange 532. As one example, the vertical flange 534 and the horizontal flange 532 may be formed and/or manufactured as a single structure. The horizontal flange 532 extends between the first end 538 and the second end 540 in the first direction 342 and between a third end 546 and a fourth end 548 in the second direction 344.

The horizontal flange 532 includes a first portion 542 and a second portion 544 that are separated from each other by the vertical flange 534. The lower coupling structure 514 may be referred to as a lower T-chord or a lower discrete T-chord based on the cross-sectional T-shape of the coupling structure defined by the horizontal and vertical flanges 532, 534. In one example, the first portion 542 of the horizontal flange 532 may be operably coupled with a first skin panel (not shown) of an airfoil, and the second portion 544 of the horizontal flange 532 may be operably coupled with a different, second skin panel (not shown) of the airfoil.

The vertical flange 534 extends between a fifth end 554 and a sixth end 556 in the second direction 344. For example, the fifth end 554 of the vertical flange 534 and the third end 546 of the horizontal flange 532 are disposed on one side of the lower coupling structure 514, and the sixth end 556 of the vertical flange 534 and the fourth end 548 of the horizontal flange are disposed on the other side of the lower coupling structure 514 in the second direction. The lower coupling structure 514 is different from the lower coupling structure 314 illustrated in FIG. 3 in that the vertical flange 534 of the lower coupling structure 514 is shifted and/or offset from the horizontal flange 532 in the second direction 344. For example, in the illustrated example of FIGS. 5 and 6, the fifth end 554 of the vertical flange 534 is offset from the third end 546 of the horizontal flange 532 by a first distance 566. Additionally, the sixth end 556 of the vertical flange 534 is offset from the fourth end 548 of the horizontal flange 532 by a second distance 568. For example, a portion of the mating end 550 of the vertical flange 534 is separated from a portion of the horizontal flange 532. Alternatively, in the illustrated example of FIG. 4, the sixth end 356 of the vertical flange 534 is aligned with or substantially aligned with the fourth end 348 of the horizontal flange 332 in the second direction 344.

The horizontal flange 532 extends a length between the third and fourth ends 546, 548 that is less than, smaller, or shorter than a length between the leading and trailing edges 522, 524 of the rib 506. For example, the length of the horizontal flange 532 in the second direction 344 is less than, a fraction of, a percentage of, or the like, the length of the rib 506 such that plural separate, discrete lower coupling structures 514 may be positioned along the length of the lower portion 528 of the rib 506. Additionally, the vertical flange 534 extends a length between the fifth and sixth ends 554, 556 that is less than, smaller, or shorter than the length between the leading and trailing edges 522, 524 of the rib 506. For example, the length of the vertical flange 534 in the second direction 344 is less than, a fraction of, a percentage of, or the like, the length of the rib 506 such that plural separate, discrete lower coupling structures 514 may be positioned along the length of the lower portion 528 of the rib 506.

The lower coupling structure 514 includes plural fastener features 570 extending through the vertical flange 534. The fastener features may represent passages that extend between and are open at the second coupling interface 564 and an opposite free interface 574 that may receive fasteners (not shown) for coupling the vertical flange 534 with the lower portion 528 of the rib 506. The horizontal flange 532 includes plural fastener features 571 such as passages that may receive fasteners for coupling the horizontal flange 532 with the one or more skin panels and/or splices of the airfoil. The fastener features 570 of the vertical flange 534 and the fastener features 571 of the horizontal flange 532 are hidden from view in FIG. 9 for clarity.

In the illustrated example, the fastener features 570 of the vertical flange 534 are arranged in a pattern including four first fastener features 570A arranged in a first row and four second fastener features 570B arranged in a second row. The first row 570A and the second row 570B extend in the second direction 344 between the fifth and sixth ends 554, 556 of the vertical flange 534. The fastener features 570A of the first row are aligned with or are substantially aligned with the fastener features 570B of the second row in the second direction 344. In another example, one of the rows may have less than four or more than four fastener features, the vertical flange 534 may include a single row of fastener features or the pattern may include more than two rows of fastener features having any number of features disposed in each of the one or more rows. In the illustrated example, the first row of fastener features 570A is separated from the second row of fastener features 570B in the third direction 354 by a distance 572A. Additionally, adjacent fastener features of the first and/or second rows are separated from each other in the second direction 344 by a distance 572B. Optionally, the fastener features may be arranged in any alternative patterned and/or random arrangement.

The fastener features 571 of the horizontal flange 532 are arranged in a pattern that includes four first fastener features 571A arranged in a first row and four second fastener features 571B arranged in a second row. The first and second rows extend in the second direction 344 between the third and fourth ends 546, 548 in the second direction 344. Optionally, the horizontal flange 532 may include a single row of fastener features, one or more rows may include less than four or more than four fastener features, or any combination therein. In one example, the pattern of the fastener features on the second portion 544 of the horizontal flange 532 may mirror and/or be similar to, substantially the same as, or be different than a pattern of fastener features on the first portion 542 of the horizontal flange 532 (not shown).

The plural fastener features 570 of the vertical flange 534 are arranged in the pattern, with the pattern including a general center or centroid 573 of the pattern. Additionally, the plural fastener features 571 of the horizontal flange 532 are arranged in the pattern, with the pattern including a general center or centroid 575. In at least one example, the centroid 573 of the fastener features 570 of the vertical flange 534 is offset from the centroid 575 of the fastener features 571 of the horizontal flange 532 in the second direction 344. In at least one example, the fifth end 554 of the vertical flange 534 may be offset from the third end 546 of the horizontal flange 532 by the first distance 566 and the sixth end 556 of the vertical flange 534 may be offset from the fourth end 548 of the horizontal flange 532 by the second distance 568 based on the position of the centroid 573 relative to the position of the centroid 575. For example, the offset position of the vertical flange 534 relative to the horizontal flange 532 may be based on the locations and/or pattern of the fastener features 570 of the vertical flange 534 relative to the locations and/or pattern of the fastener features 571 of the horizontal flange 532. In alternative examples, the offset position of the vertical flange relative to the horizontal flange may be based on one or more additional and/or alternative considerations (e.g., size and/or space availability for the lower coupling structures within the airfoil, weight restrictions of the lower coupling structures, etc.).

Figure 10:
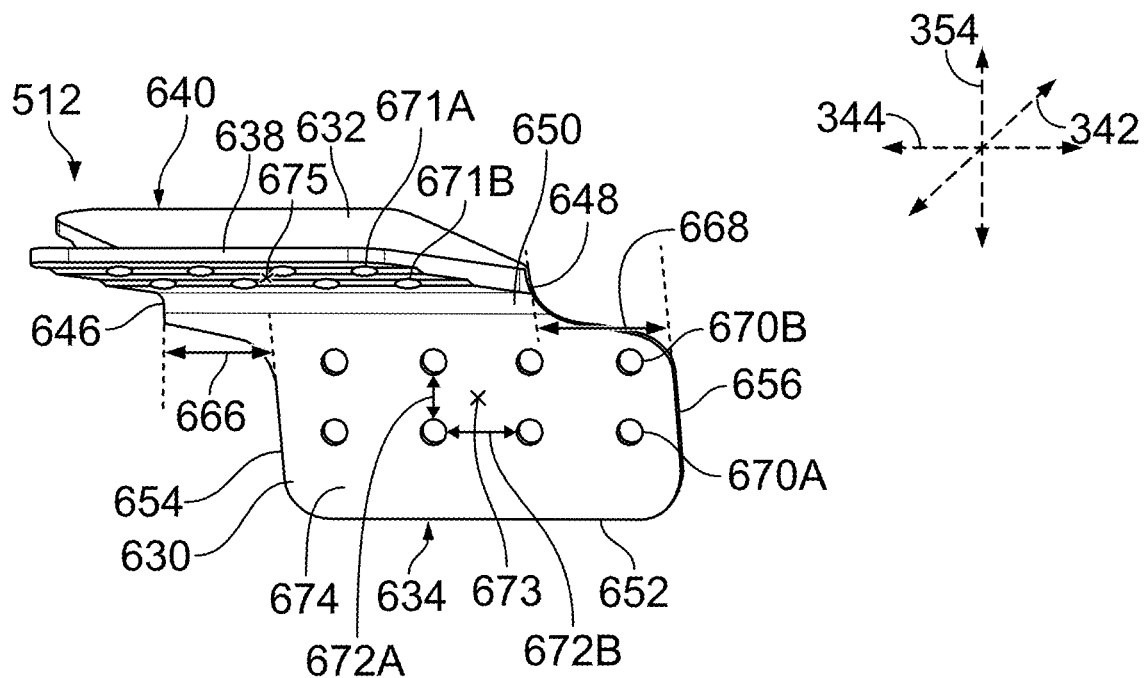
FIG. 10 illustrates a side view of an upper coupling structure of the airfoil coupling system shown in FIGS. 5 and 6, according to an example of the present disclosure.
Figure 11:
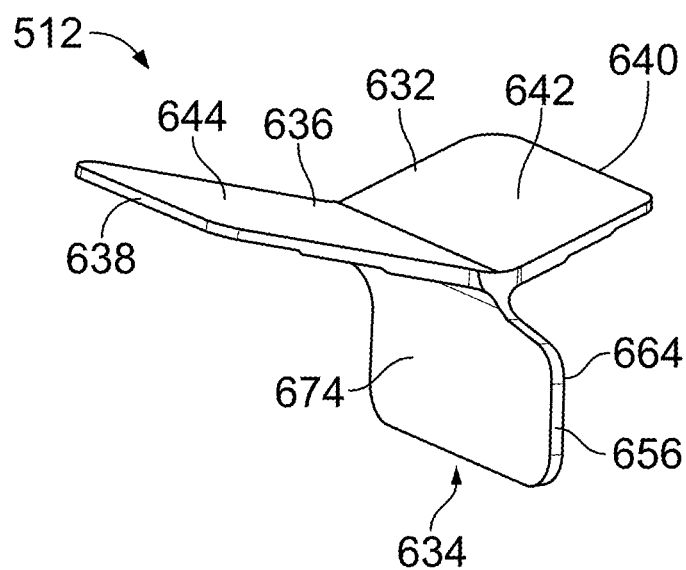
FIG. 11 illustrates a perspective view of the upper coupling structure shown in FIG. 10, according to an example of the present disclosure.

FIG. 10 illustrates a side view of one of the upper coupling structures 512 of the airfoil coupling system 500 and FIG. 11 illustrates a perspective view of the upper coupling structure 512, according to an example of the present disclosure. The upper coupling structure 512 includes a body 630 that includes a horizontal flange 632 and a vertical flange 634 that is operably coupled with the horizontal flange 632. For example, the horizontal and the vertical flanges 632, 634 may be manufactured and/or formed as a single, unitary structure. The horizontal flange 632 extends between a first end 638 and a second end 640 in the first direction 342 and between a third end 646 and a fourth end 648 in the second direction 344. The horizontal flange 632 includes a first coupling interface 636 that is operably coupled with one or more skin panels (not shown) of an airfoil. The vertical flange 634 extends between a fifth end 654 and a sixth end 656 in the second direction 344 and between a mating end 650 and a free end 652 in the third direction.

The horizontal flange 632 includes a first portion 642 and a second portion 644 that is separated from the first portion 642 by the vertical flange 634. The upper coupling structure 512 may be referred to as an upper T-chord, an upper discrete T-chord, or the like, based on the cross-sectional T-shape of the coupling structure defined by the horizontal and vertical flanges 632, 634. In one example, the first portion 642 of the horizontal flange 632 may be operably coupled with a first skin panel (not shown) of an airfoil and the second portion 644 of the horizontal flange 632 may be operably coupled with a different, second skin panel (not shown) of the airfoil. In another example, the first and second portions 642, 644 may be operably coupled with the same or a common, single skin panel.

The fifth end 654 of the vertical flange 634 and the third end 646 of the horizontal flange 632 are disposed on one side of the upper coupling structure 512 and the sixth end 656 of the vertical flange 634 and the fourth end 648 of the horizontal flange 632 are disposed on the other side of the upper coupling structure 512 in the second direction 344. In the illustrated example shown in FIGS. 10 and 11, the vertical flange 634 of the upper coupling structure 512 is shifted and/or offset from the horizontal flange 632 in the second direction 344. For example, the fifth end 654 of the vertical flange 634 is shifted or offset from the third end 646 of the horizontal flange 632 by a first distance 666. Additionally, the sixth end 656 of the vertical flange 634 is offset from the fourth end 648 of the horizontal flange 632 by a second distance 668. For example, a portion of the mating end 650 of the vertical flange 634 is separated from a portion of the horizontal flange 632.

The horizontal flange 632 extends a length between the third and fourth ends 646, 648 that is less than, smaller, or shorter than a length between the leading and trailing edges 522, 524 of the rib 506. For example, the length of the horizontal flange 632 in the second direction 344 is less than, is a fraction of, is a percentage of, or the like, the length of the rib 506 such that plural separated, discrete upper coupling structures 512 may be positioned along the length of the upper portion 526 of the rib 506. Additionally, the vertical flange 634 extends a length between the fifth and sixth ends 654, 656 that is less than, smaller, or shorter than the length between the leading and trailing edges 522, 524 of the rib 506. For example, the length of the vertical flange 634 in the second direction 344 is less than, a fraction of, a percentage of, or the like, the length of the rib 506 such that plural separate, discrete upper coupling structures 512 may be positioned along the length of the upper portion 526 of the rib 506.

The upper coupling structure 512 includes plural fastener features 670 that extend through the vertical flange 634. The fastener features may represent passages the extend between and an open at a second coupling interface 664 of the vertical flange 634 and an opposite free interface 674. The passages may receive fasteners (not shown) for coupling the vertical flange 634 of the upper coupling structure 512 with the upper portion 526 of the rib 506. The horizontal flange 632 includes plural fastener features 671 such as passages that may receive fasteners for coupling the horizontal flange 632 with the one or more skin panels and/or splices of the airfoil. The fastener features 670 of the vertical flange 634 and the fastener features 671 of the horizontal flange 632 are hidden from view in FIG. 11 for clarity.

In the illustrated example, the fastener features of the vertical flange 634 are arranged in a pattern that includes four first fastener features 670A arranged in a first row and four second fastener features 670B arranged in a second row. The first and second rows 670A, 670B extend in the second direction 344 between the fifth and sixth ends 654, 656 of the vertical flange 634. The fastener features 670A of the first row are aligned with or are substantially aligned with the fastener features 670B of the second row in the second direction 344. In another example, one of the rows may have less than four or more than four fastener features, the vertical flange 634 may include a single row of fastener features or the pattern may include more than two rows of fastener features having any number of features disposed in each of the one or more rows. In the illustrated example, the first row of fastener features 670A is separated from the second row of fastener features 670B in the third direction 354 by a distance 672A. Additionally, adjacent fastener features of the first and/or second rows are separated from each other in the second direction 344 by a distance 672B. Optionally, the fastener features may be arranged in any alternative patterned and/or random arrangement.

In the illustrated example, the fastener features 671 of the horizontal flange 632 are arranged in a pattern that includes four first fastener features 671A arranged in a first row and four second fastener features 671B arranged in a second row. The first and second rows extend in the second direction 344 between the third and fourth ends 646, 648 in the second direction 344. Optionally, the horizontal flange 632 may include a single row of fastener features, one or more rows may include less than four or more than four fastener features, or any combination therein. In one example, the pattern of the fastener features on the second portion 644 of the horizontal flange 632 (shown in FIG. 10) may mirror and/or be similar to, substantially the same as, or be different than a pattern of fastener features on the first portion 642 of the horizontal flange 632 (not shown).

The plural fastener features 670 of the vertical flange 634 are arranged in the pattern, with the pattern including a general center or centroid 673 of the pattern. Additionally, the plural fastener features 671 of the horizontal flange 632 are arranged in the pattern, with the pattern including a general center or centroid 675. In at least one example, the centroid 673 of the fastener features 670 of the vertical flange 634 is offset from the centroid 675 of the fastener features 671 of the horizontal flange 632 in the second direction 344. In at least one example, the fifth end 654 of the vertical flange 634 may be offset from the third end 646 of the horizontal flange 632 by the first distance 666 and the sixth end 656 of the vertical flange 634 may be offset from the fourth end 648 of the horizontal flange 632 by the second distance 668 based on the position of the centroid 673 relative to the centroid 675. For example, the offset position of the vertical flange 634 relative to the horizontal flange 632 may be based on the locations and/or pattern of the fastener features 670 of the vertical flange 634 relative to the locations and/or pattern of the fastener features 671 of the horizontal flange 632. In alternative examples, the offset position of the vertical flange relative to the horizontal flange may be based on one or more additional and/or alternative considerations.

Figure 12:
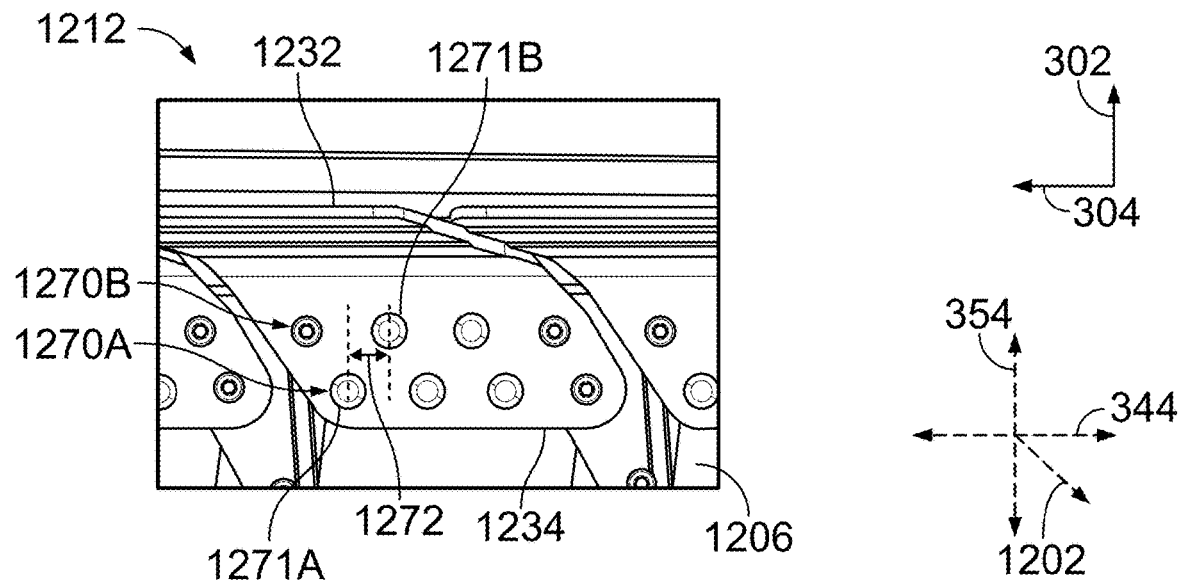
FIG. 12 illustrates a side view of an upper coupling structure, according to an example of the present disclosure.

FIG. 12 illustrates a side view of an upper coupling structure 1212, according to an example of the present disclosure. The upper coupling structure includes a horizontal flange 1232 and a vertical flange 1234 that is operably coupled with an upper portion of a rib 1206. In the illustrated example, the vertical flange 1234 extends away from the horizontal flange 1232 in an angular or radial direction 1202 relative to the second and third directions 344, 354. For example, the vertical flange 1234 extends away from the horizontal flange 1232 at an angle between the second and third directions 344, 354. The vertical flange 1234 extends angularly and/or radially away from the aft direction 304 of the airfoil and towards a forward end of the airfoil that is opposite the aft direction 304.

The vertical flange 1234 includes plural fastener features 1270 arranged in a first row of fastener features 1270A and a second row of fastener features 1270B. The fastener features in the first row 1270A are linearly offset from and/or misaligned with the fastener features in the second row 1270B in the second direction 344. For example, a fastener feature 1271A of the first row 1270A is linearly offset from a fastener feature 1271B of the second row 1270B in the second direction 344 by a distance 1272. In another example, the first row 1270A may include a single fastener feature and the second row 1270B may include one or more fastener features that may be misaligned with and/or offset from the single fastener feature in the first row 1270A. In one example, the angular position of the vertical flange 1234 relative to the horizontal flange 1232 may control a stress concentration created from the shifting fastener pattern of the fastener features.

In at least one example, shifting of the fastener features of the first row 1270A relative to the fastener features of the second row 1270B changes a fastener centroid or general center of the overall fastener pattern. For example, by positioning the fastener features of the first row 1270A linearly offset from the fastener features of the second row 1270B, the centroid of the fastener pattern moves towards the horizontal flange 1232 of the upper coupling structure 1212, and thereby towards an upper skin panel of the airfoil to which the horizontal flange 1232 is operably coupled. Alternatively, by positioning the fastener features of the first row 1270A linearly aligned with the fastener features of the second row 1270B (e.g., as shown in FIG. 10), the centroid of the fastener pattern moves away from the horizontal flange 1232, and thereby away from the upper skin panel of the airfoil to which the horizontal flange 1232 is coupled. For example, shifting position of the fastener features of the first and second rows (or any pattern of the fastener features arrangement) controls a moment arm and thereby a fastener peaking load created by a shear moment.

Figure 13:
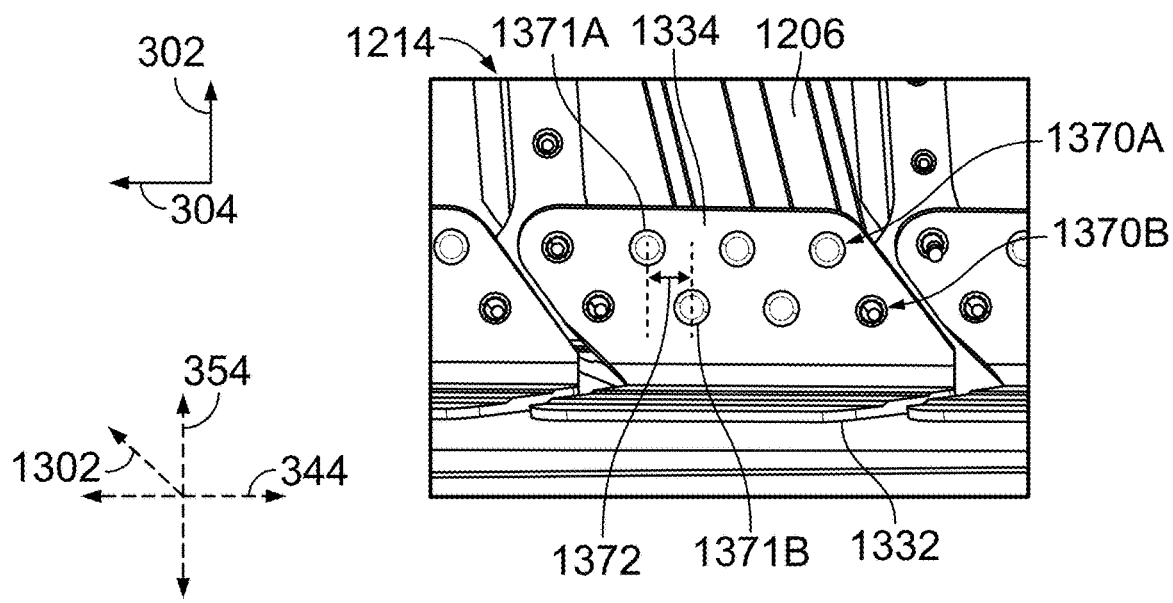
FIG. 13 illustrates a side view of a lower coupling structure, according to an example of the present disclosure.

FIG. 13 illustrates a side view of a lower coupling structure 1214, according to an example of the present disclosure. The lower coupling structure 1214 includes a horizontal flange 1332 and a vertical flange 1334 that is operably coupled with a lower portion of the rib 1206. In the illustrated example, the vertical flange 1334 extends away from the horizontal flange 1332 in an angular or radial direction 1302 relative to the second and third directions 344, 354. For example, the vertical flange 1334 extends away from the horizontal flange 1323 at an angle between the second and third directions 344, 354. Unlike the upper coupling structure 1212 shown in FIG. 12, the vertical flange 1334 extends angularly and/or radially toward the aft direction 304 of the airfoil and away from a forward end of the airfoil that is opposite the aft direction 304.

The vertical flange 1334 includes plural fastener features 1370 arranged in a first row of fastener features 1370A and a second row of fastener features 1370B. The fastener features in the first row 1370A are linearly offset from and/or misaligned with the fastener features in the second row 1370B in the second direction 344. For example, a fastener feature 1371A of the first row 1370A is linearly offset from a fastener feature 1371B of the second row 1370B in the second direction 344 by a distance 1372. In another example, the first row 1370A may include a single fastener feature and the second row 1370B may include one or more fastener features that may be misaligned with and/or offset from the single fastener feature in the first row 1370A. In one example, the angular position of the vertical flange 1334 relative to the horizontal flange 1332 may control a stress concentration created from the shifting fastener pattern of the fastener features.

Figure 14:
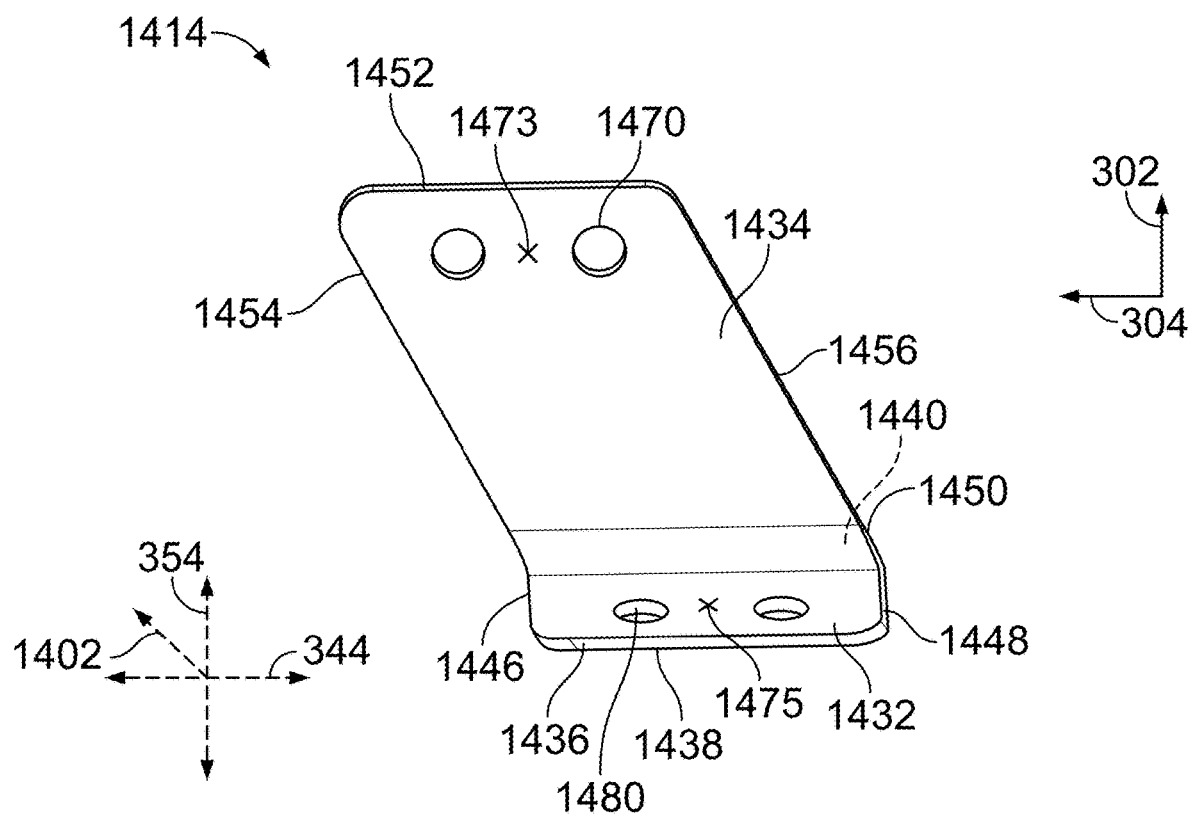
FIG. 14 illustrates a side view of an airfoil coupling structure, according to an example of the present disclosure.

FIG. 14 illustrates a side view of an airfoil coupling structure 1414, according to an example of the present disclosure. The airfoil coupling structure 1414 may represent a lower coupling structure that may be operably coupled with a lower portion of a rib and a lower skin panel of the airfoil or an upper coupling structure that may be operably coupled with an upper portion of the rib and an upper skin panel.

The coupling structure 1414 includes a horizontal flange 1432 that extends between a first end 1438 and a second end 1440 in the first direction 342 (e.g., into and out of the page, shown in FIG. 4) and between a third end 1446 and a fourth end 1448 in the second direction 344. A vertical flange 1434 extends between a fifth end 1454 and a sixth end 1456 in the second direction 344 and between a mating end 1450 and a free end 1452 in the third direction 354. The horizontal flange 1432 may be coupled with a skin panel of an airfoil (not shown) via one of more fastener features 1480 of the horizontal flange 1432 and the vertical flange 1434 may be operably coupled with a lower portion of a rib (not shown) via one or more fastener features 1470 of the vertical flange 1434. In the illustrated example, the vertical flange 1434 includes one row that includes two fastener features 1470. Additionally, the horizontal flange 1432 includes one row that includes two fastener features 1480. In alternative examples, the vertical flange may include two or more rows of fastener features, each of the rows may include one or more fastener features, the fastener features of the different rows may be linearly aligned or offset from each other, or any combination therein. Additionally, the horizontal flange may include two or more rows of fastener features, each of the rows may include one or more fastener features, the fastener features of the different rows may be linearly aligned or offset from each other, or any combination therein.

In the illustrated example, the mating end 1450 of the vertical flange 1434 is operably coupled with the second end 1440 of the horizontal flange 1432. For example, the coupling structure 1414 may be referred to as an L-chord, a discrete L-chord, or the like, based on the cross-sectional L-shape of the coupling structure 1414 defined by the horizontal and vertical flanges 1432, 1434. The vertical flange 1434 extends away from the horizontal flange 1432 in an angular or radial direction 1402 relative to the second and third directions 344, 354. For example, the vertical flange 1434 extends away from the horizontal flange 1423 in the radial direction 1402 at an angle between the second and third directions 344, 354. Like the lower coupling structure 1214 shown in FIG. 13, the vertical flange 1434 extends radially toward the aft direction 304 of the airfoil and away from a forward end of the airfoil that is opposite the aft direction 304. The fifth end 1454 of the vertical flange 1434 extends radially away from the third end 1446 of the horizontal flange 1432, and the sixth end 1456 of the vertical flange 1434 extends radially away from the fourth end 1448 of the horizontal flange 1432.

In the illustrated example, the fastener features 1470 of the vertical flange 1434 are arranged in the pattern, with the pattern including a general center or centroid 1473 of the pattern. Additionally, the fastener features 1480 of the horizontal flange 1432 are arranged in the pattern, with the pattern including a general center or centroid 1475. In the illustrated example, the centroid 1473 of the fastener features 1470 of the vertical flange 1434 is offset from the centroid 1475 of the fastener features 1480 of the horizontal flange 1432 in the first direction 342 (shown in FIG. 4) and in the second direction 344. In at least one example, the position of the vertical flange 1434 being angularly offset from and/or extending radially away from the horizontal flange may be based on the position of the centroid 1473 of the fastener features 1470 of the vertical flange 1434 relative to the position of the centroid 1475 of the fastener features 1480 of the horizontal flange 1432. In alternative examples, the offset position of the vertical flange relative to the horizontal flange may be based on one or more additional and/or alternative considerations.

Figure 15A:
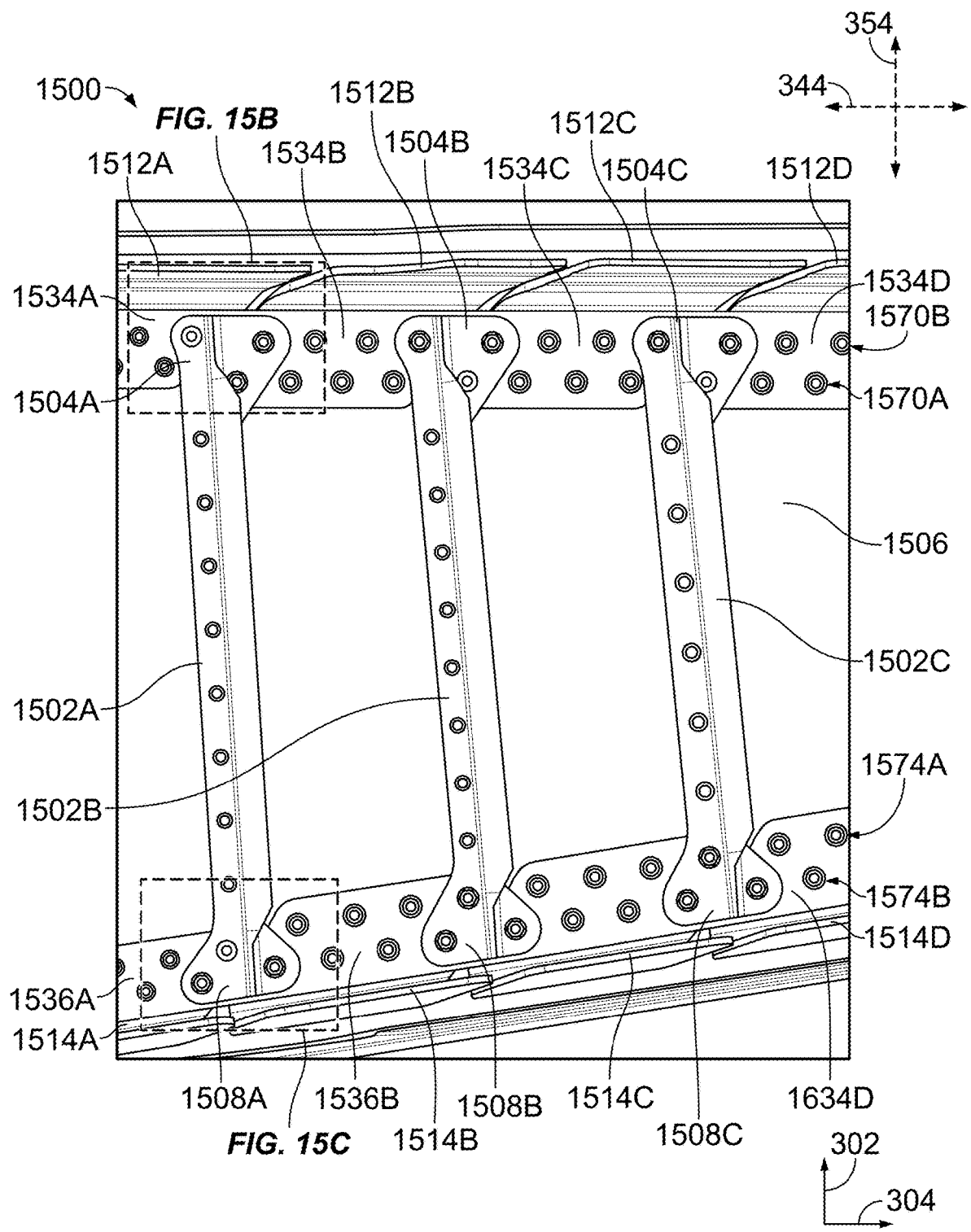
FIG. 15A illustrates a partial side view of an airfoil coupling system, according to an example of the present disclosure.

FIG. 15A illustrates a partial side view of an airfoil coupling system 1500, according to an example of the present disclosure. The airfoil coupling system 1500 includes plural separate, discrete upper coupling structures 1512A-D, each having a horizontal flange configured to be coupled with one or more skin panels of the airfoil and a vertical flange 1534 operably coupled with an upper portion of a rib 1506. The airfoil coupling system 1500 also includes plural separate, discrete lower coupling structures 1514A-D, each having a horizontal flange configured to be coupled with one or more skin panels of the airfoil and a vertical flange 1536 operably coupled with a lower portion of the rib 1506. The upper coupling structures 1512A-D include plural fastener features 1570 that are arranged in a first row 1570A of fastener features 1571 and a second row 1570B of fastener features 1571. In the illustrate example, each of the upper coupling structures 1512A-D includes four fastener features 1571 in the first row 1570A and four fastener features 1571 in the second row 1570B but alternatively may include any number of fastener features. In the illustrated example, the fastener features of the first row 1570A are linearly offset from the fastener features of the second row 1570B (e.g., as illustrated in FIG. 12).

The lower coupling structures 1514A-D include plural fastener features 1571 that are arranged in a first row 1574A and a second row 1574B. In the illustrate example, each of the lower coupling structures 1514A-D includes four fastener features 1571 in the first row 1574A and four fastener features 1571 in the second row 1574B but alternatively may include any number of fastener features. In the illustrated example, the fastener features 1571 of the first row 1574A are linearly offset from the fastener features 1571 of the second row 1574B (e.g., as illustrated in FIG. 13).

The airfoil coupling system 1500 includes plural extension structures 1502A-C. Each extension structure 1502A-C extends between a first end 1504A-C and a second end 1508A-C. In the illustrated example, each extension structure 1502A-C includes plural fastener passages 1581, 1582 that may be aligned with fastener features 1571, 1572 of the upper and lower coupling structures 1512, 1514.

Figure 15B:
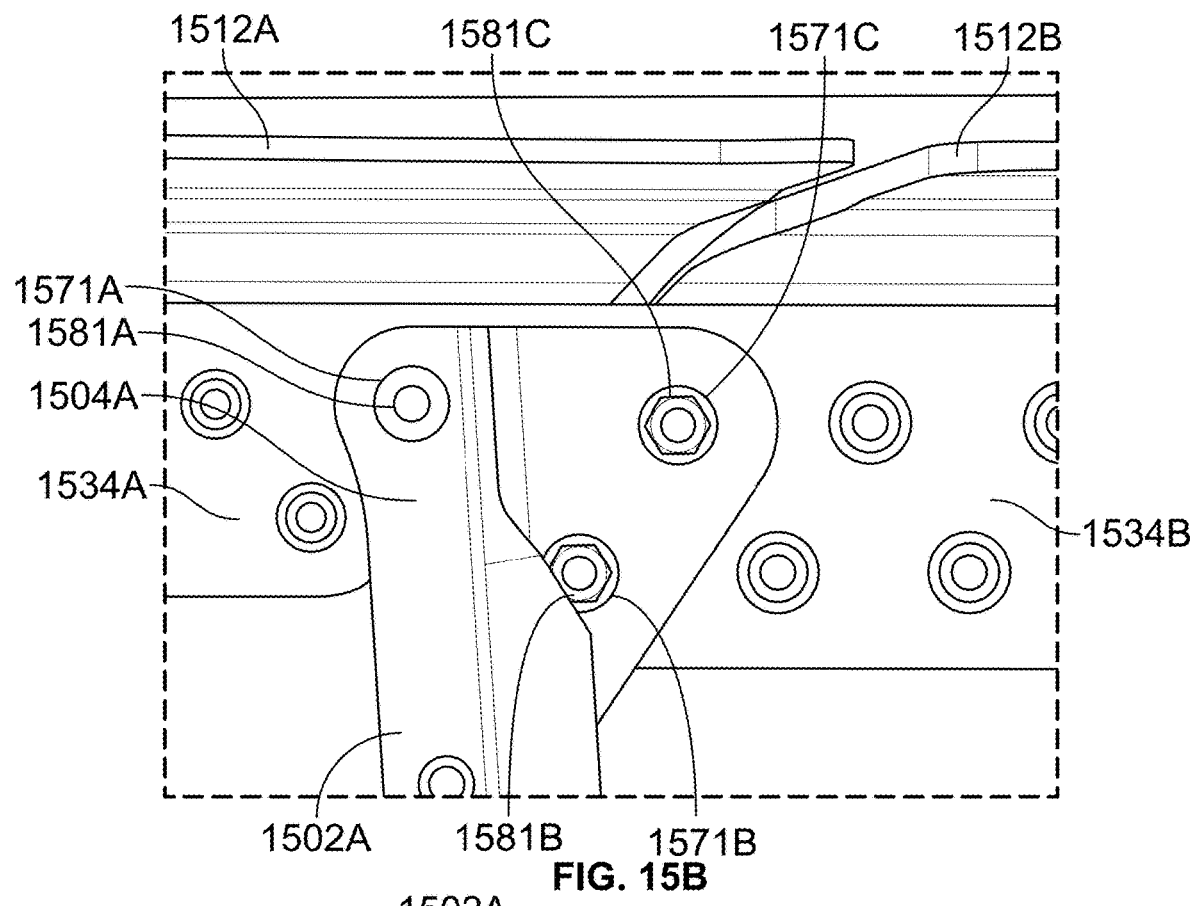
FIG. 15B illustrates a magnified view of a top portion of the airfoil coupling system shown in FIG. 15A, according to an example of the present disclosure.

FIG. 15B illustrates a magnified view of a portion 15B-15B of the first end 1504A of the first extension structure 1502A, according to an example of the present disclosure. Referring to FIGS. 15A and 15B, the first end 1504A of the first extension structure 1502A is operably coupled with a first upper coupling structure 1512A and an adjacent second upper coupling structure 1512B. For example, a first passage 1581A of the first end 1504A of the first extension structure 1502A is coupled with a first fastener feature 1571A of the vertical flange 1534A of the first upper coupling structure 1512A. Additionally, a second passage 1581B of the first end 1504A of the first extension structure 1502A is coupled with a second fastener feature 1571B of the vertical flange 1534B of the second upper coupling structure 1512B, and a third passage 1581C of the first end 1504A of the first extension structure 1502A is coupled with a third fastener feature 1571C of the vertical flange 1534B of the second upper coupling structure 1512B.

Figure 15C:
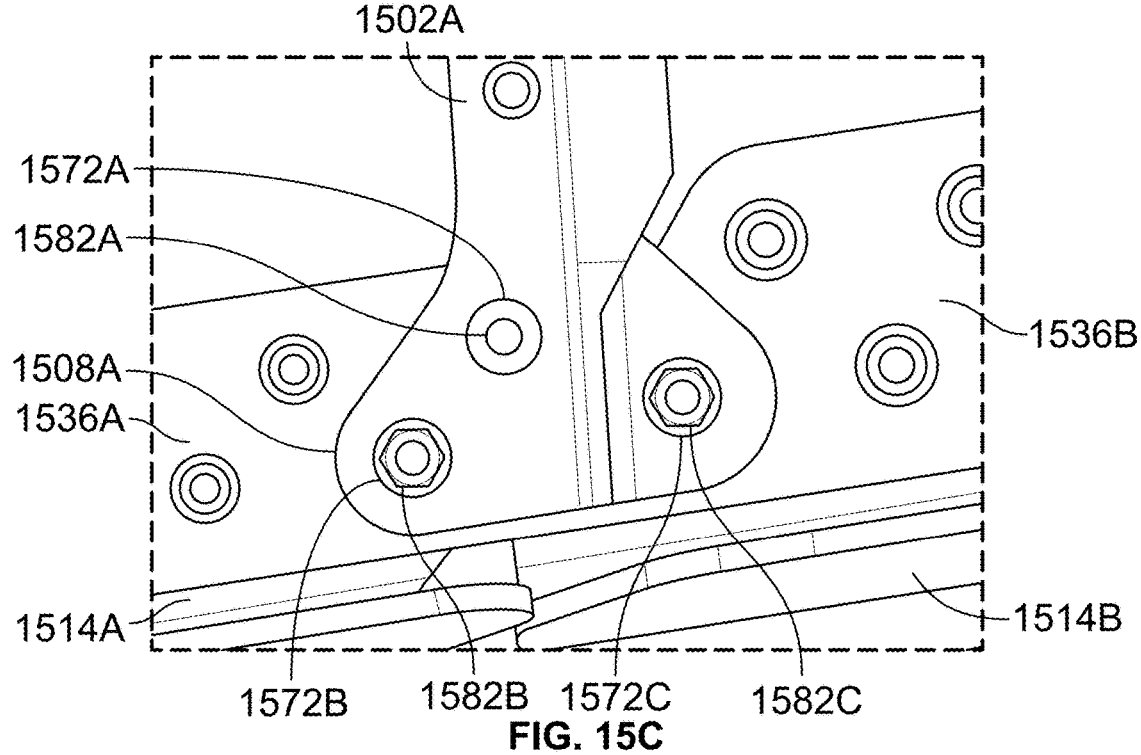
FIG. 15C illustrates a magnified view of a bottom portion of the airfoil coupling system shown in FIG. 15A, according to an example of the present disclosure.

FIG. 15C illustrates a magnified view of a portion of the second end 1508A of the first extension structure 1502A, according to an example of the present disclosure. Referring to FIGS. 15A and 15C, the second end 1508A of the first extension structure 1502A is operably coupled with a first lower coupling structure 1514A and an adjacent second lower coupling structure 1514B. For example, a first passage 1582A of the second end 1508A of the first extension structure 1502A is coupled with a first passage 1572A of the vertical flange 1536A of the first lower coupling structure 1514A, a second passage 1582B of the second end 1508A of the first extension structure 1502A is coupled with a second passage 1572B of the vertical flange 1536A of the first lower coupling structure 1514A. Additionally, a third passage 1582C of the second end 1508A of the first extension structure 1502A is coupled with a third passage 1572C of the vertical flange 1536B of the second lower coupling structure 1514B.

The first extension structure 1502A provides a line and/or pathway of structural support between the first and second upper coupling structures 1512A, 1521B and the first and second lower coupling structures 1514A, 1514B. Additionally, the second extension structure 1502B provides a line and/or pathway of structural support between the second and third upper coupling structures 1512B, 1521C and the second and third lower coupling structures 1514B, 1514C. The third extension structure 1502C provides a line and/or pathway of structural support between the third and fourth upper coupling structures 1512C, 1521D and the third and fourth lower coupling structures 1514C, 1514D. For example, the extension structures 1502A-C are positioned tilted relative to the upward direction 302 in a forward-to-aft direction. The first end 1504 of each extension structure 1502 is coupled with a forward end of an upper coupling structure 1512 and the second end 1508 of each extension structure 1502 is coupled with an aft end of a lower coupling structure 1514.

In at least one example, the extension structures 1502A-C are coupled with adjacent upper and lower coupling structures 1512, 1514, respectively, such as to bias a vertical stiffener load between pairs of upper coupling structures 1512 and pairs of lower coupling structures 1514 in a forward-to-aft direction. For example, as shown in FIGS. 15A and 15B, the first end 1504A of the first extension structure 1502A is operably coupled with the first upper coupling structure 1512A at one connection point and is operably coupled with the adjacent or neighboring second upper coupling structure 1512B at two connection points. For example, the first end 1504A of the first extension structure 1502A has fewer connections on an aft end of the first upper coupling structure 1512A and has more connections on a forward end of the second upper coupling structure 1512B.

Alternatively, as shown in FIGS. 15A and 15C, the second end 1508A of the first extension structure 1502A is operably coupled with the first lower coupling structure 1514A at two connection points, and is operably coupled with the adjacent or neighboring second lower coupling structure 1514B at one connection point. For example, the second end 1508A of the first extension structure 1502A has more connections on an aft end of the first lower coupling structure 1514A and has fewer connections on a forward end of the second lower coupling structure 1514B.

The first end 1504A of the first extension structure 1502A is connected to fewer connection points (e.g., one connection point) of the first upper coupling structure 1512A relative to the number of connection points of the second end 1508A to the first lower coupling structure 1514A (e.g., two connection points). Additionally, the first end 1504A of the first extension structure 1502A is connected to move connection points (e.g., two connection points) of the second upper coupling structure 1512B relative to the number of connection points of the second end 1508A to the second lower coupling structure 1514B (e.g., one connection point).

Figure 16:
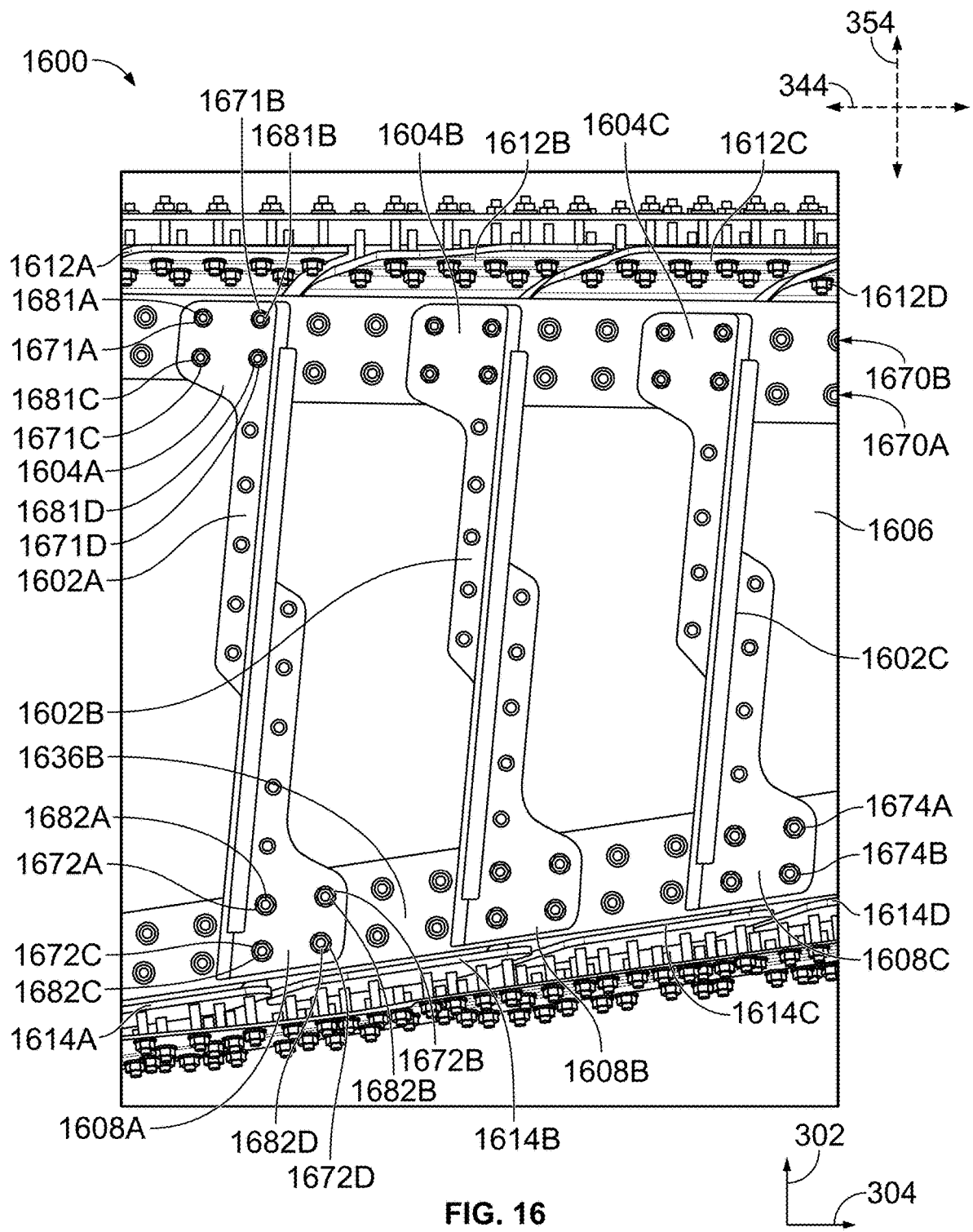
FIG. 16 illustrates a partial side view of an airfoil coupling system, according to an example of the present disclosure.

FIG. 16 illustrates a partial side view of an airfoil coupling system 1600, according to an example of the present disclosure. The airfoil coupling system 1600 includes plural, separate, discrete upper coupling structures 1612A-D, each having a horizontal flange configured to be coupled with one or more skin panels and a vertical flange configured to be coupled with an upper portion of a rib 1606. The airfoil coupling system 1600 also includes plural separate, discrete lower coupling structures 1614A-D, each having a horizonal flange configured to be coupled with one or more skin panels and a vertical flange configured to be coupled with a lower portion of the rib 1606. The upper coupling structures 1612A-D include plural fastener features 1671 arranged in a first row 1670A and a second row 1670B. In the illustrated example, the fastener features of the first row 1670A are linearly aligned with the fastener features of the second row 1670B. The lower coupling structures 1614A-D include plural fastener features 1672 arranged in a first row 1674A and a second row 1674B. In the illustrated example, the fastener features of the first row 1674A are linearly aligned with the fastener features of the second row 1674B. In alternative examples, two or more of the fastener features may be linearly offset from each other, may be positioned and/or arranged in an alternative pattern, may include fewer or more fastener features, or any combination therein.

The airfoil coupling system 1600 includes plural extension structures 1602A-C, each extending between a first end 1604A-C and a second end 1608A-C. The extension structures 1602 include plural fastener passages 1681, 1682 that may be aligned with fastener features 1671, 1672 of the upper and lower coupling structures 1612, 1614. The extension structures 1602A-C are shaped and positioned to provide a line and/or pathway of structure support between the upper and lower coupling structures 1612, 1614 in a forward-to-aft direction.

In the illustrated example, the first end 1604A of the first extension structure 1602A is coupled with a first upper coupling structure 1612A but is not coupled with an adjacent second upper coupling structure 1612B. The second end 1608A of the first extension structure 1602A is not coupled with a first lower coupling structure 1614A but is coupled with an adjacent second lower coupling structure 1614B. For example, the first end 1604A of the first extension structure 1602A includes a first passage 1681A that is coupled with a first fastener feature 1671A of a first upper coupling structure 1612A, a second passage 1681B that is coupled with a second fastener feature 1671B of the first upper coupling structure 1612A, a third passage 1681C that is coupled with a third fastener feature 1671C of the first upper coupling structure 1612A, and a fourth passage 1681D that is coupled with a fourth fastener feature 1671D of the first upper coupling structure 1612A. The second end 1608A of the first extension structure 1602A includes a first passage 1682A that is coupled with a first fastener feature 1672A of the second lower coupling structure 1614B, a second passage 1682B that is coupled with a second fastener feature 1672B of the second lower coupling structure 1614B, a third passage 1682C that is coupled with a third fastener feature 1672C of the second lower coupling structure 1614B, and a fourth passage 1682D that is coupled with a fourth fastener feature 1672D of the second lower coupling structure 1614B.

The second extension structure 1602B extends between the second upper coupling structure 1612B and the third lower coupling structure 1614C, and the third extension structure 1602C extends between the third upper coupling structure 1612C and the fourth lower coupling structure 1614D.

Figure 17:
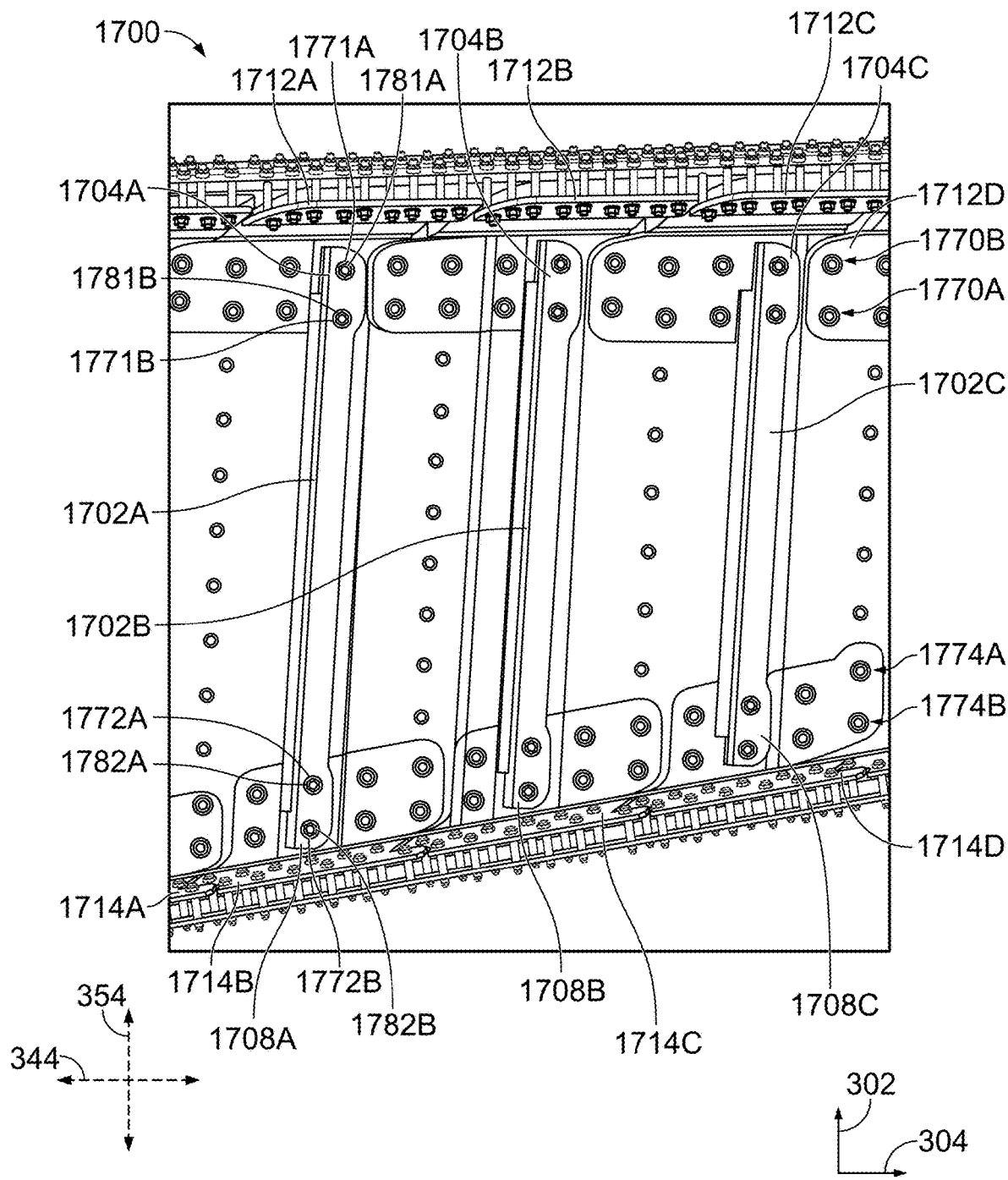
FIG. 17 illustrates a partial side view of an airfoil coupling system, according to an example of the present disclosure.

FIG. 17 illustrates a partial side view of an airfoil coupling system 1700, according to an example of the present disclosure. The airfoil coupling system 1700 includes plural separate, discrete upper coupling structures 1712A-D and plural separate, discrete lower coupling structures 1714A-D. The upper coupling structures 1712A-D include plural fastener features 1771 arranged in a first row 1770A and a second row 1770B. In the illustrated example, the fastener features of the first row 1770A are linearly aligned with the fastener features of the second row 1770B. The lower coupling structures 1714A-D include plural fastener features 1772 arranged in a first row 1774A and a second row 1774B. In the illustrated example, the fastener features of the first row 1774A are linearly aligned with the fastener features of the second row 1774B. In alternative examples, two or more of the fastener features may be linearly offset from each other, may be positioned and/or arranged in an alternative pattern, may include fewer or more fastener features, or any combination therein.

The airfoil coupling system 1700 includes extension structures 1702A-C, each extending between a first end 1704A-C and a second end 1708A-C. The extension structures 1702 include plural fastener passages 1781, 1782 that may be aligned with fastener features 1771, 1772 of the upper and lower coupling structures 1712, 1714, respectively. The extension structures 1702A-C are shaped and positioned to provide a line and/or pathway of structural support between the upper and lower coupling structures 1712, 1714 in a forward-to-aft direction.

In the illustrated example, the first end 1704A of the first extension structure 1702A is coupled with a first upper coupling structure 1712A and the second end 1708A of the first extension structure 1702A is coupled with a second lower coupling structure 1714B. For example, the first end 1704A of the first extension structure 1702A includes a first passage 1781A that is coupled with a first fastener feature 1771A of the first upper coupling structure 1712A and a second passage 1781B that is coupled with a second fastener feature 1771B of the first upper coupling structure 1712A. The second end 1708A of the first extension structure 1702A includes a first passage 1782A that is coupled with a first fastener feature 1772A of the second lower coupling structure 1714B and a second passage 1782B that is coupled with a second fastener feature 1772B of the second lower coupling structure 1712B. Similarly, the second extension structure 1702B extends between the second upper coupling structure 1712B and the third lower coupling structure 1714C, and the third extension structure 1702C extends between the third upper coupling structure 1712C and the fourth lower coupling structure 1714D.

Figure 18:
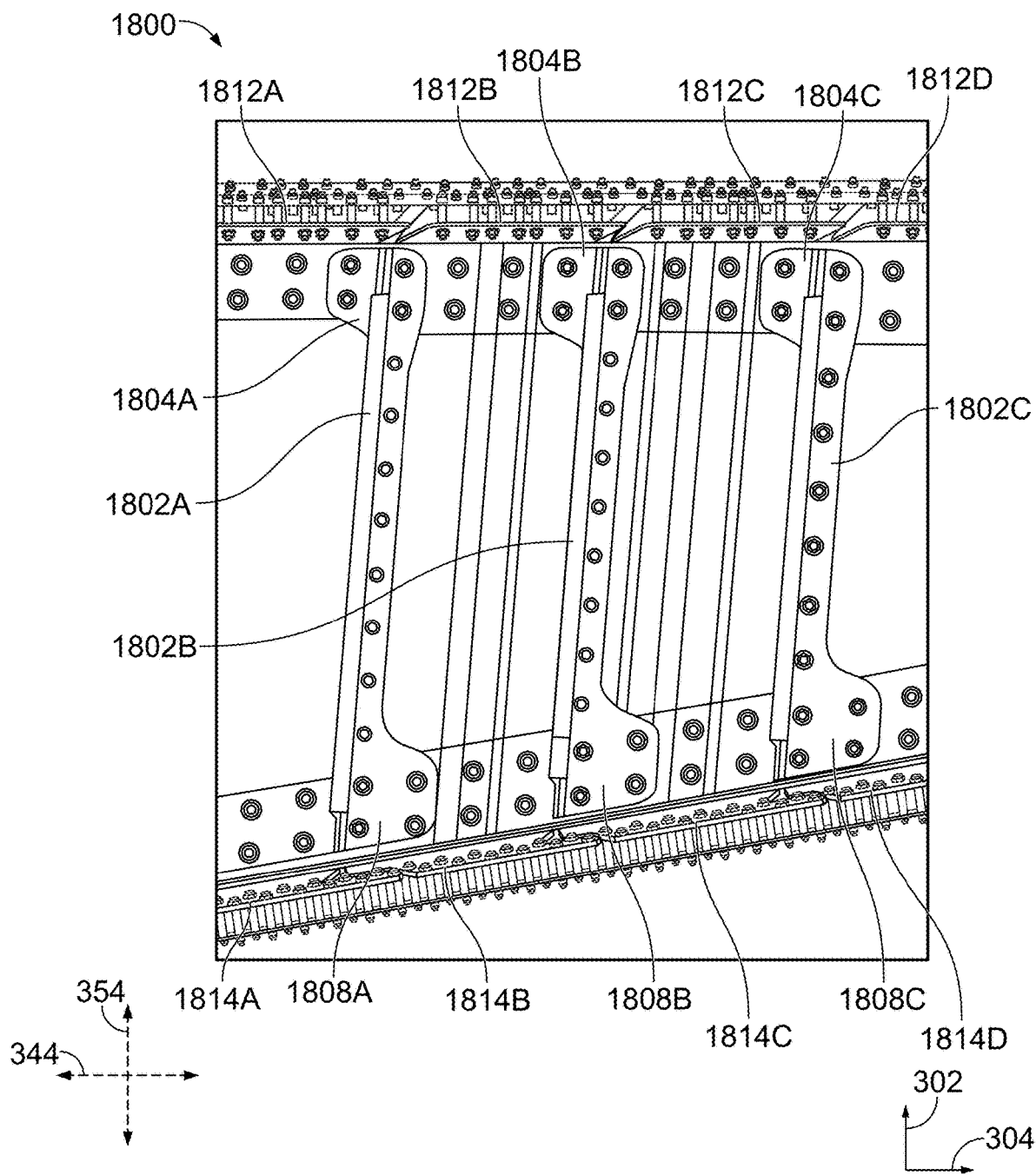
FIG. 18 illustrates a partial side view of an airfoil coupling system, according to an example of the present disclosure.

FIG. 18 illustrates a partial side view of an airfoil coupling system 1800, according to an example of the present disclosure. The airfoil coupling system 1800 includes plural separate, discrete upper coupling structures 1812A-D and plural separate, discrete lower coupling structures 1814A-D. Extension structures 1802A-C extend between a first end 1804A-D and a second end 1808A-C. The extension members 1802A-C include plural fastener passages that may be aligned with fastener features of the upper and lower coupling structures 1812, 1814, respectively.

In the illustrated example, the first end 1804A of the first extension structure 1802A is coupled with two fastener features of a first upper coupling structure 1812A and is coupled with two fastener features of an adjacent, second upper coupling structure 1812B. The second end 1808A of the first extension structure 1802A is not coupled with a first lower coupling structure 1814A but instead is coupled with four fastener features of an adjacent second lower coupling structure 1814B. For example, the extension structures 1802A-C are shaped and positioned relative to the upper and lower coupling structures to provide a line and/or pathway of structural support between the upper and lower coupling structures 1812, 1814 in a forward-to-aft direction.

As described herein, example of the present disclosure provide airfoil coupling systems that include multiple separate, discrete, individual upper and lower coupling structures that may be used to couple a rib of an airfoil of an aircraft with one or more panels of the airfoil of the aircraft. The airfoil coupling assemblies may include extension structures that extend a height of the rib and may provide structural support between the upper and lower coupling structures of the airfoil. In one example, the separate, individual, discrete upper and lower coupling structures may include a vertical flange that is radially offset and/or extends radially away from a horizontal or skin flange. In another example, the separate, individual, and discrete upper and/or lower coupling structures may include vertical flanges that are offset from horizontal or skin flanges of the coupling structures. For example, the vertical flanges may extend a distance towards a forward end of the airfoil that is greater than a distance of the horizontal flanges. In another example, the vertical and horizontal flanges of the upper and lower coupling structures may include fastener features that may be used to couple the vertical flange with a rib and to couple the horizontal flange with one or more panels. A general center location of a pattern of the fastener features of the vertical flange may be offset from a general center location of a pattern of the fastener features of the horizontal flange. Optionally, one or more fastener features of the vertical flange may be shifted and/or linearly offset from one or more other fastener features of the vertical flange.

Examples of the present disclosure provide smaller, discretely segmented upper and lower coupling T-chord structures used to couple ribs of an airfoil with panels of the airfoil that may be easier to source (e.g., materials may cost less, be more readily available, or the like), may improve ergonomics during assembly of an airfoil (e.g., may be easier for operators to install the discretely segmented T-chord structures relative to a large, single chord element), and improve efficiency of assembly of the airfoil relative to a large, single-piece chord element. Additionally, the shift of the vertical flanges of the coupling structures relative to the position of the horizontal flanges of the coupling structures, the pattern and/or arrangement of fastener features of the vertical flange, and/or the pattern and/or arrangement of the fastener features of the vertical flange relative to the pattern and/or arrangement of the fastener features of the horizontal flange controls one or more stresses, loads, moments, etc., of the smaller, discretely segmented upper and lower coupling T-chord structures.

Further, the disclosure comprises examples according to the following clauses:

Clause 1: an airfoil coupling system, comprising:
plural airfoil coupling structures, each of the airfoil coupling structures comprising a body including:
a horizontal flange including a first coupling interface configured to be operably coupled with one or more panels of an airfoil of an aircraft, the first coupling interface extending between a first end and a second end in a first direction and between a third end and a fourth end in a second direction; and
a vertical flange comprising a mating end operably coupled with the horizontal flange, the vertical flange including a second coupling interface configured to be operably coupled with a rib of the airfoil, the second coupling interface extending between a fifth end and a sixth end in the second direction and between the mating end and a free end in a third direction,
wherein each of the airfoil coupling structures are disposed at different locations along a length of the rib between a leading edge and a trailing edge of the rib.

Clause 2: the airfoil coupling system of clause 1, wherein the fifth end of the vertical flange of at least one of the airfoil coupling structures is offset from the third end of the horizontal flange of the at least one airfoil coupling structure, and the sixth end of the vertical flange of the at least one airfoil coupling structure is offset from the fourth end of the horizontal flange of the at least one airfoil coupling structure in the second direction.

Clause 3: the airfoil coupling system of clauses 1 or 2, wherein the vertical flange of at least one of the airfoil coupling structures extends in a radial direction away from the horizontal flange at an angle relative to the second and third directions.

Clause 4: the airfoil coupling system of any of clauses 1-3, wherein the vertical flange of at least one of the airfoil coupling structures includes plural fastener features arranged in a pattern, wherein the pattern includes at least two rows extending between the fifth and sixth ends of the vertical flange, each of the at least two rows including one or more fastener features.

Clause 5: the airfoil coupling system of clause 4, wherein the one or more fastener features in a first row of the two or more rows are linearly offset from the one or more fastener features in a second row of the two or more rows in the second direction.

Clause 6: the airfoil coupling system of any of clauses 1-5, wherein a first portion of the horizontal flange of at least one of the airfoil coupling structures is configured to be operably coupled with a first panel of the airfoil, and wherein a second portion of the horizontal flange of the at least one airfoil coupling structures is configured to be operably coupled with a second panel of the airfoil.

Clause 7: the airfoil coupling system of any of clauses 1-6, wherein the first coupling interface of the horizontal flange of at least one of the airfoil coupling structures is configured to be operably coupled with one or more of a lower skin panel of the airfoil of the aircraft or an upper skin panel of the airfoil of the aircraft.

Clause 8: the airfoil coupling system of any of clauses 1-7, wherein a first length between the third end and the fourth end of the horizontal flange of each of the airfoil coupling structures is a fraction of the distance between the leading edge and the trailing edge of the rib, and wherein a second length between the fifth end and the sixth end of the vertical flange of each of the airfoil coupling structures is a fraction of the distance between the leading edge and the trailing edge of the rib.

Clause 9: an airfoil coupling system configured to secure a rib of an airfoil of an aircraft to panels of the airfoil, the airfoil coupling system comprising:
plural upper coupling structures, each of the upper coupling structures comprising a body including an upper horizontal flange and an upper vertical flange operably coupled with the upper horizontal flange, the upper horizontal flange of each of the upper coupling structures including an upper coupling interface configured to be operably coupled with at least one upper panel of the panels of the airfoil, the upper vertical flange of each of the upper coupling structures configured to be operably coupled with the rib of the airfoil; and
plural lower coupling structures, each of the lower coupling structures comprising a body including a lower horizontal flange and a lower vertical flange operably coupled with the lower horizontal flange, the lower horizontal flange of each of the lower coupling structures including a lower coupling interface configured to be operably coupled with at least one lower panel of the panels of the airfoil, the lower vertical flange of each of the lower coupling structures configured to be operably coupled with the rib of the airfoil, wherein the plural upper coupling structures are configured to be operably coupled with an upper portion of the rib at locations along a first length of the upper portion of the rib between a leading edge and a trailing edge of the rib, and wherein the plural lower coupling structures are configured to be operably coupled with a lower portion of the rib at locations along a second length of the lower portion of the rib between the leading edge and the trailing edge of the rib.

Clause 10: the airfoil coupling system of clause 9, wherein a number of upper coupling structures are operably coupled with the upper portion of the rib and a same number of lower coupling structures are operably coupled with the lower portion of the rib.

Clause 11: the airfoil coupling system of clauses 9 or 10, wherein a front end of the upper vertical flange of each of the upper coupling structures is offset from a front end of the upper horizontal flange in a first direction.

Clause 12: the airfoil coupling system of clause 11, wherein the upper vertical flange includes plural fastener features arranged in a pattern including at least two rows of fastener features, wherein each of the at least two rows includes one or more fastener features, wherein the one or more fastener features in a first row of the two or more rows are linearly offset from the one or more fastener features in a second row of the two or more rows in the first direction.

Clause 13: the airfoil coupling system of any of clauses 9-12, wherein a front end of the lower vertical flange of each of the lower coupling structures is offset from a front end of the lower horizontal flange in a first direction.

Clause 14: the airfoil coupling system of clause 13, wherein the lower vertical flange includes plural fastener features arranged in a pattern including at least two rows of fastener features, wherein each of the at least two rows includes one or more fastener features, wherein the one or more fastener features in a first row of the two or more rows are linearly offset from the one or more fastener features in a second row of the two or more rows in the first direction.

Clause 15: the airfoil coupling system of any of clauses 9-14, further comprising extension structures each including an upper portion operably coupled with one or more of the upper coupling structures and a lower portion operably coupled with one or more of the lower coupling structures.

Clause 16: the airfoil coupling system of clause 15, wherein the upper portion of a first extension structure is operably coupled with two adjacent upper coupling structures, and wherein the lower portion of the first extension structure is operably coupled with two adjacent lower coupling structures.

Clause 17: the airfoil coupling system of clause 15, wherein the upper coupling structures includes a first upper coupling structure and an adjacent second upper coupling structure, and wherein the lower coupling structures includes a first lower coupling structure and an adjacent second lower coupling structure, wherein the upper portion of a first extension structure is operably coupled with the first upper coupling structure, and wherein the lower portion of the first extension structure is operably coupled with the second lower coupling structure.

Clause 18: an airfoil assembly, comprising:
an upper airfoil skin panel extending between a leading edge and a trailing edge of an airfoil in a first direction;
a lower airfoil skin panel extending between the leading edge and the trailing edge of the airfoil in the first direction;
a rib structure extending between a top portion and a bottom portion, wherein the top portion is disposed proximate an interior surface of the upper airfoil skin panel and the bottom portion is disposed proximate an interior surface of the lower airfoil skin panel, the rib structure extending between a front end proximate the leading edge of the airfoil and a rear end proximate the trailing edge of the airfoil in the first direction;
plural discrete upper coupling structures, each of the discrete upper coupling structures comprising a body including an upper horizontal flange and an upper vertical flange operably coupled with the upper horizontal flange, the upper horizontal flange of each of the discrete upper coupling structures including an upper coupling interface configured to be operably coupled with the interior surface of the upper airfoil skin panel, the upper vertical flange of each of the discrete upper coupling structures configured to be operably coupled with the top portion of the rib structure; and
plural discrete lower coupling structures, each of the discrete lower coupling structures comprising a body including a lower horizontal flange and a lower vertical flange operably coupled with the lower horizontal flange, the lower horizontal flange of each of the discrete lower coupling structures including a lower coupling interface configured to be operably coupled with the interior surface of the lower airfoil skin panel, the lower vertical flange of each of the discrete lower coupling structures configured to be operably coupled with the bottom portion of the rib structure,
wherein each of the discrete upper coupling structures are operably coupled with the top portion of the rib structure at locations along a first length of the top portion of the rib structure between the front end and the rear end of the rib structure, and
wherein each of the discrete lower coupling structures are operably coupled with the bottom portion of the rib structure at locations along a second length of the bottom portion of the rib structure between the front end and the rear end of the rib structure.

Clause 19: the airfoil assembly of clause 18, wherein a front end of the upper vertical flange of one or more of the discrete upper coupling structures is offset from a front end of the upper horizontal flange in the first direction, and wherein a front end of the lower vertical flange of one or more of the discrete lower coupling structures is offset from a front end of the lower horizontal flange in the first direction.

Clause 20: the airfoil assembly of clauses 18 or 19, further comprising extension structures each including an upper portion operably coupled with two adjacent upper coupling structures and a lower portion operably coupled with two adjacent lower coupling structures.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An airfoil comprising an airfoil coupling system configured to secure a rib of the airfoil of an aircraft to panels of the airfoil, the airfoil coupling system comprising:
    plural upper coupling structures, each of the upper coupling structures comprising a body including an upper horizontal flange and an upper vertical flange operably coupled with the upper horizontal flange, the upper horizontal flange of each of the upper coupling structures including an upper coupling interface configured to be operably coupled with at least one upper panel of the panels of the airfoil, the upper vertical flange of each of the upper coupling structures configured to be operably coupled with the rib of the airfoil; and
    plural lower coupling structures, each of the lower coupling structures comprising a body including a lower horizontal flange and a lower vertical flange operably coupled with the lower horizontal flange, the lower horizontal flange of each of the lower coupling structures including a lower coupling interface configured to be operably coupled with at least one lower panel of the panels of the airfoil, the lower vertical flange of each of the lower coupling structures configured to be operably coupled with the rib of the airfoil, wherein the plural upper coupling structures are configured to be operably coupled with an upper portion of the rib at locations along a first length of the upper portion of the rib between a leading edge and a trailing edge of the rib, and
    wherein the plural lower coupling structures are configured to be operably coupled with a lower portion of the rib at locations along a second length of the lower portion of the rib between the leading edge and the trailing edge of the rib.

2. The airfoil of claim 1, wherein at least one of the upper coupling structures are operably coupled with the upper portion of the rib and a same number of lower coupling structures are operably coupled with the lower portion of the rib.

3. The airfoil of claim 1, wherein a front end of the upper vertical flange of each of the upper coupling structures is offset from a front end of the upper horizontal flange in a first direction.

4. The airfoil of claim 3, wherein the upper vertical flange includes plural fastener features arranged in a pattern including at least two rows of fastener features, wherein each of the at least two rows includes one or more fastener features, wherein the one or more fastener features in a first row of the two or more rows are linearly offset from the one or more fastener features in a second row of the two or more rows in the first direction.

5. The airfoil of claim 1, wherein a front end of the lower vertical flange of each of the lower coupling structures is offset from a front end of the lower horizontal flange in a first direction.

6. The airfoil of claim 5, wherein the lower vertical flange includes plural fastener features arranged in a pattern including at least two rows of fastener features, wherein each of the at least two rows includes one or more fastener features, wherein the one or more fastener features in a first row of the two or more rows are linearly offset from the one or more fastener features in a second row of the two or more rows in the first direction.

7. The airfoil of claim 1, further comprising extension structures each including an upper portion operably coupled with one or more of the upper coupling structures and a lower portion operably coupled with one or more of the lower coupling structures.

8. The airfoil of claim 7, wherein the upper portion of a first extension structure is operably coupled with two adjacent upper coupling structures, and wherein the lower portion of the first extension structure is operably coupled with two adjacent lower coupling structures.

9. The airfoil of claim 7, wherein the upper coupling structures include a first upper coupling structure and an adjacent second upper coupling structure, and wherein the lower coupling structures include a first lower coupling structure and an adjacent second lower coupling structure, wherein the upper portion of a first extension structure is operably coupled with the first upper coupling structure, and wherein the lower portion of the first extension structure is operably coupled with the second lower coupling structure.

10. An airfoil assembly, comprising:
- an upper airfoil skin panel extending between a leading edge and a trailing edge of an airfoil in a first direction;
- a lower airfoil skin panel extending between the leading edge and the trailing edge of the airfoil in the first direction;
- a rib structure extending between a top portion and a bottom portion, wherein the top portion is disposed proximate an interior surface of the upper airfoil skin panel and the bottom portion is disposed proximate an interior surface of the lower airfoil skin panel, the rib structure extending between a front end proximate the leading edge of the airfoil and a rear end proximate the trailing edge of the airfoil in the first direction;
- plural discrete upper coupling structures, each of the discrete upper coupling structures comprising a body including an upper horizontal flange and an upper vertical flange operably coupled with the upper horizontal flange, the upper horizontal flange of each of the discrete upper coupling structures including an upper coupling interface configured to be operably coupled with the interior surface of the upper airfoil skin panel, the upper vertical flange of each of the discrete upper coupling structures configured to be operably coupled with the top portion of the rib structure; and
- plural discrete lower coupling structures, each of the discrete lower coupling structures comprising a body including a lower horizontal flange and a lower vertical flange operably coupled with the lower horizontal flange, the lower horizontal flange of each of the discrete lower coupling structures including a lower coupling interface configured to be operably coupled with the interior surface of the lower airfoil skin panel, the lower vertical flange of each of the discrete lower coupling structures configured to be operably coupled with the bottom portion of the rib structure,
- wherein each of the discrete upper coupling structures are operably coupled with the top portion of the rib structure at locations along a first length of the top portion of the rib structure between the front end and the rear end of the rib structure, and
- wherein each of the discrete lower coupling structures are operably coupled with the bottom portion of the rib structure at locations along a second length of the bottom portion of the rib structure between the front end and the rear end of the rib structure.

11. The airfoil assembly of claim 10, wherein a front end of the upper vertical flange of one or more of the discrete upper coupling structures is offset from a front end of the upper horizontal flange in the first direction, and wherein a front end of the lower vertical flange of one or more of the discrete lower coupling structures is offset from a front end of the lower horizontal flange in the first direction.

12. The airfoil assembly of claim 10, further comprising extension structures each including an upper portion operably coupled with two adjacent upper coupling structures and a lower portion operably coupled with two adjacent lower coupling structures.

* * * * *